(12) United States Patent
Wang et al.

(10) Patent No.: US 11,539,046 B2
(45) Date of Patent: Dec. 27, 2022

(54) ION-CONDUCTING MATERIAL, CORE-SHELL STRUCTURE CONTAINING THE SAME, ELECTRODE PREPARED WITH THE CORE-SHELL STRUCTURE AND METAL-ION BATTERY EMPLOYING THE ELECTRODE

(71) Applicant: INDUSTRIAL TECHNOLOGY RESEARCH INSTITUTE, Hsinchu (TW)

(72) Inventors: Tsung-Hsiung Wang, Dali (TW); Chang-Rung Yang, Hsinchu (TW); Ming-Yi Lu, Zhudong Township (TW); Yu-Han Li, New Taipei (TW); Jing-Pin Pan, Chutung Chen (TW); Chen-Chung Chen, Taoyuan (TW); Li-Chun Chen, Keelung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 128 days.

(21) Appl. No.: 17/118,103

(22) Filed: Dec. 10, 2020

(65) Prior Publication Data

US 2021/0202935 A1     Jul. 1, 2021

(30) Foreign Application Priority Data

Dec. 27, 2019  (TW) .................. 108148057

(51) Int. Cl.
*H01M 4/02*       (2006.01)
*H01M 4/36*       (2006.01)
(Continued)

(52) U.S. Cl.
CPC ............ *H01M 4/366* (2013.01); *C08G 75/06* (2013.01); *C08L 101/025* (2013.01);
(Continued)

(58) Field of Classification Search
CPC ........................................ H01M 4/02
See application file for complete search history.

(56) References Cited

U.S. PATENT DOCUMENTS 10,224,539 B2    3/2019   Kalaiselvi et al.
2014/0197032 A1  7/2014   Willis et al.
(Continued)

FOREIGN PATENT DOCUMENTS

CN    100346510 C    10/2007
CN    101859887 A    10/2010
(Continued)

OTHER PUBLICATIONS

Japanese Office Action, dated Apr. 13, 2021, for Japanese Application No. 2019-237985, with an English translation.

(Continued)

*Primary Examiner* — Jacob B Marks
(74) *Attorney, Agent, or Firm* — Birch, Stewart, Kolasch & Birch, LLP

(57) ABSTRACT

An ion-conducting material, a core-shell structure containing the ion-conducting material, an electrode prepared with the core-shell structure and a metal-ion battery employing the electrode are provided. The core-shell structure includes a core particle and an organic-inorganic composite layer formed on the surface of the core particle for encapsulating the core particle. The core particle includes lithium cobalt oxide, lithium nickel cobalt oxide, lithium nickel cobalt manganese oxide, or lithium nickel cobalt aluminum oxide. Also, the organic-inorganic composite layer includes nitrogen-containing hyperbranched polymer and an ion-conducting material. The ion-conducting material is a lithium-containing linear polymer or a modified Prussian blue, (Continued)

wherein the modified Prussian blue has an ion-conducting group and the lithium-containing linear polymer has an ion-conducting segment.

20 Claims, 7 Drawing Sheets

(51) Int. Cl.
  *H01M 4/131* (2010.01)
  *H01M 4/505* (2010.01)
  *H01M 4/525* (2010.01)
  *H01M 4/62* (2006.01)
  *H01M 10/0562* (2010.01)
  *C09J 127/16* (2006.01)
  *C08G 75/06* (2006.01)
  *C08L 101/02* (2006.01)
  *H01M 10/0525* (2010.01)

(52) U.S. Cl.
  CPC ........... *C09J 127/16* (2013.01); *H01M 4/131* (2013.01); *H01M 4/505* (2013.01); *H01M 4/525* (2013.01); *H01M 4/625* (2013.01); *H01M 4/628* (2013.01); *H01M 10/0525* (2013.01); *H01M 10/0562* (2013.01); *C08K 2201/001* (2013.01); *H01M 2004/028* (2013.01); *H01M 2300/0068* (2013.01)

(56) References Cited

U.S. PATENT DOCUMENTS

| | | | |
|---|---|---|---|
| 2017/0155128 A1 | 6/2017 | He et al. | |
| 2017/0288209 A1 | 10/2017 | Liu | |
| 2017/0294687 A1* | 10/2017 | Burshtain | H01M 4/366 |
| 2018/0019464 A1 | 1/2018 | Xia et al. | |
| 2018/0166680 A1 | 6/2018 | Ophir et al. | |
| 2018/0277839 A1 | 9/2018 | Luo et al. | |

FOREIGN PATENT DOCUMENTS

| | | |
|---|---|---|
| CN | 103872373 A | 6/2014 |
| CN | 103943854 A | 7/2014 |
| CN | 104577095 A | 4/2015 |
| CN | 105449217 A | 3/2016 |
| CN | 106058230 A | 10/2016 |
| CN | 106133959 A | 11/2016 |
| CN | 107039652 A | 8/2017 |
| CN | 107316991 A | 11/2017 |
| CN | 108028369 A | 5/2018 |
| CN | 107207281 B | 9/2018 |
| CN | 109004201 A | 12/2018 |
| CN | 109244418 A | 1/2019 |
| CN | 109256533 A | 1/2019 |
| CN | 109817939 A | 5/2019 |
| CN | 110447127 A | 11/2019 |
| JP | 10-21898 A | 1/1998 |
| JP | 2005-247679 A | 9/2005 |
| JP | 2014-523072 A | 9/2014 |
| JP | 2016-170937 A | 9/2016 |
| JP | 2017-117792 A | 6/2017 |
| JP | 2016-6129 A | 1/2018 |
| TW | I518972 B | 1/2016 |
| TW | 201834304 A | 9/2018 |
| TW | I640119 B | 11/2018 |
| WO | WO 2016/063813 A1 | 4/2016 |

OTHER PUBLICATIONS

Kim et al., "Prospect and Reality of Ni-Rich Cathode for Commercialization", Advanced Energy Material, 2018, vol. 8, pp. 1702028 (1 to 25).

Office Action of the corresponding TW application No. 108148057 dated Aug. 14, 2020.

Shuai et al., "Research Progress in the Single Crystal of High Nickel Cathode Materials for Lithium-ion Batteries", Shandong Chemical Industry, 2018, vol. 47, pp. 46-49.

Chinese Office Action and Search Report for Chinese Application No. 201911380664.4 dated Dec. 15, 2021.

* cited by examiner

ION-CONDUCTING MATERIAL, CORE-SHELL STRUCTURE CONTAINING THE SAME, ELECTRODE PREPARED WITH THE CORE-SHELL STRUCTURE AND METAL-ION BATTERY EMPLOYING THE ELECTRODE

CROSS REFERENCE TO RELATED APPLICATIONS

This application claims the benefit of Taiwan Application No. 108148057, filed on Dec. 27, 2019, the disclosure of which is hereby incorporated by reference herein in its entirety.

TECHNICAL FIELD

The technical field relates to a structure containing an ion-conducting material, and in particular it relates to an electrode prepared with the structure and a metal-ion battery employing the electrode.

BACKGROUND

With the increase in demand for electric vehicles, the need for materials related to making batteries has also increased significantly. According to statistics, the demand for ternary materials for automotive batteries will reach 200,000 tons in 2020, with an average annual growth rate of 54%. Battery-related ternary materials mainly include nickel, manganese and cobalt which are the mainstream of cathode materials for lithium ion batteries. A ternary material with high nickel content has the advantages of high capacity and low cost, and there are abundant sources of raw materials for it. Therefore, a high nickel content ternary material is a battery material with great potential. However, when the nickel content increases, it causes a series of difficult technical problems such as the formation of non-stoichiometric materials and sensitivity to humidity. For example, under high-temperature conditions, the high-nickel material NMC811 has the problems of catalyst effect, accelerated decomposition and oxidation of the electrolyte, cracks in the high-nickel structure, elution of manganese ions, and damage to the solid-electrolyte interphases (SEI) film on the anode. In addition, the high nickel content material has other issues such as strong water absorption, low thermal stability, and large gas production. When the high nickel content material is used in a metal-ion battery such as a lithium battery, those shortcomings affect the battery's performance in terms of capacity, life cycle, and safety.

Thus, there are still some problems to be overcome in regards to the cathode material of the metal-ion battery.

SUMMARY

Some embodiments of the present disclosure provide a core-shell structure including a core particle and an organic-inorganic composite layer formed on the surface of the core particle for encapsulating the core particle. In some embodiments, the core particle includes lithium cobalt oxide, lithium nickel cobalt oxide, lithium nickel cobalt manganese oxide, or lithium nickel cobalt aluminum oxide. Also, the organic-inorganic composite layer includes nitrogen-containing hyperbranched polymer and an ion-conducting material. In some embodiments, the ion-conducting material is a lithium-containing linear polymer or a modified Prussian blue, wherein the lithium-containing linear polymer has an ion-conducting segment, and the modified Prussian blue has an ion-conducting group.

Some embodiments of the present disclosure also provide an electrode including the aforementioned core-shell structure.

Some embodiments of the present disclosure further provide a metal-ion battery including a cathode, an anode and a separator between the cathode and the anode, wherein the cathode includes the aforementioned core-shell structure.

Some embodiments of the present disclosure also provide an ion-conducting material including a lithium-containing linear polymer represented by formula (1):

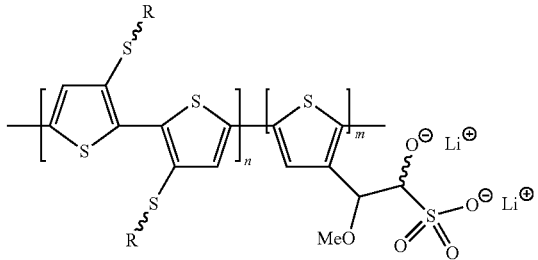

wherein R is independently selected from $C_6$-$C_{30}$ alkyl group; m is greater than 30 and no more than 100 (30<m≤100); n is greater than 30 and no more than 100 (30<n≤100); m and n are positive integers; and Me is a methyl group.

A detailed description is given in the following embodiments with reference to the accompanying drawings.

BRIEF DESCRIPTION OF THE DRAWINGS

The present disclosure can be further understood by reading the subsequent detailed description and examples with references made to the accompanying drawings, wherein.

DETAILED DESCRIPTION

Figure 1:
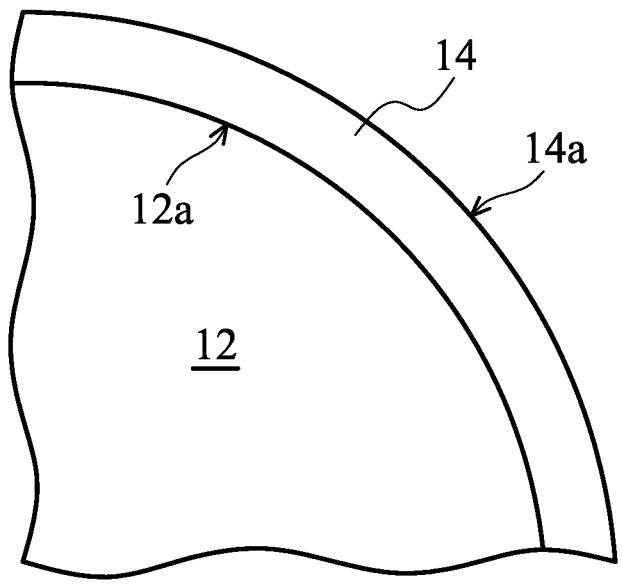
FIG. 1 is a partial schematic view of a core-shell structure, in accordance with some embodiments of the present disclosure.

Embodiments provide an ion-conducting material, a core-shell structure including the ion-conducting material, an electrode prepared with the core-shell structure and a metal-ion battery employing the electrode. According to the embodiments of the disclosure, the structure and the surface of an electrode material, such as a cathode (positive electrode) material, are strengthened and modified. Therefore, the surface-modified cathode material has high structural stability and excellent chemical resistance, in accordance with some embodiments of the present disclosure, whether it is used in a small-sized cylindrical battery (capacity: <5 Ah) or a larger-sized square lithium battery and pouch type battery (capacity: >50 Ah).

According to some embodiments of the present disclosure, a core-shell structure is provided by forming a highly-stable and multi-functional film on a core particle (such as containing high-nickel cathode material). In some embodiments, this highly-stable and multi-functional film includes an organic-inorganic composite layer having ion-conducting properties. The organic-inorganic composite layer at least includes a nitrogen-containing hyperbranched polymer and an ion-conducting material, wherein the nitrogen-containing hyperbranched polymer can be a matrix for carrying the ion-conducting material. For example, the ion-conducting material is dispersed for being linked to and/or embedded in the nitrogen-containing hyperbranched polymer. In some embodiments, the ion-conducting material is a lithium-containing linear polymer or a modified Prussian blue. The lithium-containing linear polymer has an ion-conducting segment, and the modified Prussian blue has an ion-conducting group, so that the organic-inorganic composite layer has ion-conducting properties.

According to some embodiments of the present disclosure, the organic-inorganic composite layer of this highly-stable and multi-functional film may have ion-conducting properties and electron-conducting properties. In some embodiments, a lithium-containing linear polymer of the ion-conducting material of the organic-inorganic composite layer further includes an electron-conducting segment. For example, the lithium-containing linear polymer is a copolymer having a thiophene structure to provide the electron-conducting properties. In some embodiments, the lithium-containing linear polymer has a lithium sulfonate group to provide the ion-conducting properties. Also, in some embodiments, the organic-inorganic composite layer further includes a conductive material to improve the conductivity of the organic-inorganic composite layer. The conductive material may include a conductive polymer, a first conductive additive, or a combination thereof. For example, the ion-conducting material of the organic-inorganic composite layer is a modified Prussian blue (having ion-conducting group), and this organic-inorganic composite layer may have ion-conducting properties and electron-conducting properties by adding one or more conductive materials.

In addition, besides the organic-inorganic composite layer, the films on the surface of the core particle in accordance with some other embodiments may further include other material layers, such as an organic layer and/or an adhesive layer, thereby increasing and enhancing the properties of the core-shell structure. Details of those additional material layers are described in more detail below.

According to some embodiments of the present disclosure, the core-shell structure as disclosed not only have good ion-conducting properties (or may have good electron-conducting properties and good ion-conducting properties simultaneously), but also inhibits reaction between the core particle (such as formed by the cathode material) and the electrolyte to protect the outer surface of the core particle. Therefore, the surface phase change and the expansion and contraction rate of the cathode material can be effectively reduced. When the core-shell structure of the embodiments is applied to a battery, the life cycles and the safety of the battery at high temperature can be greatly improved.

The ion-conducting material of the organic-inorganic composite layer, the core-shell structure including the ion-conducting material, the electrode prepared with the core-shell structure and a metal-ion battery employing the electrode, in accordance with some embodiments, are described below.

In some embodiments, the ion-conducting material is a lithium-containing linear polymer having an ion-conducting segment, such as a copolymer of thiophene structure having an ion-conducting segment. In one embodiment, the ion-conducting segment has a lithium sulfonate group.

In some embodiments, the ion-conducting material is a copolymer of thiophene structure having a lithium sulfonate, and it is represented by formula (1):

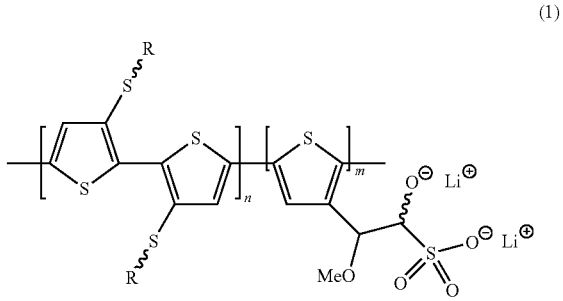

wherein R is independently selected from $C_6$-$C_{30}$ alkyl group; each of m and n is greater than 30 and no more than 100 ($30<m\leq100$, $30<n\leq100$), and m and n are positive integers. In some embodiments, each of m and n is greater than 50 and no more than 100 ($50<m\leq100$, $50<n\leq100$), wherein m and n are positive integers. Also, Me is a methyl group.

Also, the lithium-containing linear polymer as represented by formula (1) includes the ion-conducting segment represented by formula (2):

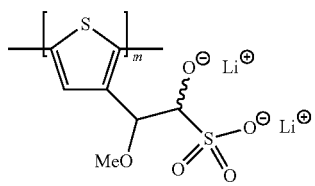

(2)

According to some embodiments of the structures represented by formula (1) and formula (2), the ions of O⁻ and the sulfonate ion ($SO_3^-$) of the ion-conducting segment can block fluoride ion (F) from approaching the core particle and prevent the metal ions (such as nickel ions) of the core particle from eluting, thereby improving the stability of the core-shell structure. In addition, lithium ion conductivity of the core particle can be improved by $Li^+$ of the ion-conducting segment represented by formula (1) and formula (2).

According to some embodiments of the present disclosure, the lithium-containing linear polymer as represented by formula (1) also includes an electron-conducting segment represented by formula (3):

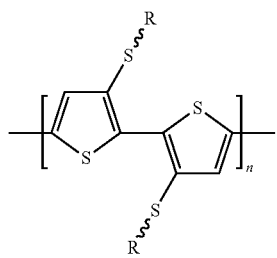

(3)

The electron-conducting segment represented by formula (3) of the structure represented by formula (1) mainly includes conductive polymer segments that have the electron mobility exceeding 0.1 cm²/Vs.

Also, another ion-conducting material is provided in accordance with some embodiments, which is a modified Prussian blue having an ion-conducting group.

In some embodiments, the modified Prussian blue is represented by the molecular formula of $K_4Fe(CN)_6$.

In one embodiment, Prussian blue can be modified with potassium nitrate to prepare the modified Prussian blue with ion-conducting properties.

It should be noted that the composite layer on the surface of the core particle further includes a conductive material if the modified Prussian blue with ion-conducting properties is contained in the composite layer, so that the organic-inorganic composite layer has both ion-conducting properties and electron-conducting properties. In some embodiments, the conductive material may include a conductive polymer, a conductive additive, or a combination thereof. In some embodiments, the conductive additive may include a conductive carbon material, and the conductive carbon material comprises conductive carbon black (such as Super P), conductive graphite flakes, carbon nanotubes (CNT), graphene, or a combination thereof.

The core-shell structure of the embodiments including the organic-inorganic composite layer as described above can be applied to a metal-ion battery, wherein a cathode (positive electrode) material of the metal-ion battery includes the core-shell structure to provide ion-conducting/electron-conducting channels. In some embodiments, the core-shell structure includes a core particle and an organic-inorganic composite layer formed on the surface of the core particle. The organic-inorganic composite layer includes a nitrogen-containing hyperbranched polymer and an ion-conducting material, wherein the ion-conducting material is a lithium-containing linear polymer or a modified Prussian blue. The compound as represented by formula (1) and $K_4Fe(CN)_6$ are respective examples of the lithium-containing linear polymer and the modified Prussian blue, in accordance with some embodiments. The organic-inorganic composite layer in the embodiments has at least ion-conducting properties to improve the cathode performance of the metal-ion battery.

In some embodiments, the nitrogen-containing hyperbranched polymer of the organic-inorganic composite layer acts as a matrix for carrying the ion-conducting material. The ion-conducting material (such as the lithium-containing linear polymer and the modified Prussian blue) is dispersed and embedded in the nitrogen-containing hyperbranched polymer. The nitrogen-containing hyperbranched polymer is interspersed with ion-conducting material to form an interpenetrating polymer network (IPN) after a sufficient reaction time, thereby improving the processability of the material layer. In some embodiments, the nitrogen-containing hyperbranched polymer is a hyperbranched polymer formed from an imide-based compound copolymerized with barbituric acid. The imide-based compound may include bismaleimide (such as N,N'-bismaleimide-4,4'-diphenylmethane), maleimide (such as benzylmaleimide), or a combination thereof. In one example, the nitrogen-containing hyperbranched polymer is a hyperbranched polymer formed by bismaleimide copolymerized with barbituric acid. In another example, the nitrogen-containing hyperbranched polymer is a hyperbranched polymer formed by maleimide oligomer copolymerized with barbituric acid. According to the embodiments of present disclosure, the ion-conducting material dispersed and embedded in the nitrogen-containing hyperbranched polymer still has excellent ion-conducting properties.

The layers and materials of the core-shell structure in some embodiments are further described below with references made to the accompanying drawings.

FIG. 1 is a partial schematic view of a core-shell structure, in accordance with some embodiments of the present disclosure. In some embodiments, a core-shell structure 10, applicable as a cathode (positive electrode) material of a battery, includes a core particle 12 and an organic-inorganic composite layer 14 (i.e. the material layers in the aforementioned descriptions) formed on the surface 12a of the core particle 12. In some embodiments, the organic-inorganic composite layer 14 encapsulates the core particle 12. The core particle of the cathode material may include lithium cobalt oxide, lithium nickel cobalt oxide, lithium nickel cobalt manganese oxide, lithium nickel cobalt aluminum oxide, or a combination thereof. In some embodiments, the organic-inorganic composite layer 14 includes a nitrogen-containing hyperbranched polymer and an ion-conducting material, wherein the ion-conducting material is a lithium-containing linear polymer or a modified Prussian blue. The modified Prussian blue has an ion-conducting group. The lithium-containing linear polymer has an ion-conducting segment.

In some embodiments, the ion-conducting material is dispersed and embedded in the nitrogen-containing hyperbranched polymer. The nitrogen-containing hyperbranched polymer is a hyperbranched polymer formed by the imide-based compound copolymerized with barbituric acid.

In some embodiments, the organic-inorganic composite layer 14 further includes one or more conductive materials. The conductive material may include the first conductive additive, a conductive polymer, or a combination thereof. The first conductive additive may include one or more conductive carbon materials. Examples of the conductive carbon material include conductive carbon black (such as Super P, available from Timcal Co.), conductive graphite flakes, carbon nanotubes (CNT), or graphene. In some embodiments, the first conductive additive includes two or more than two of the conductive carbon materials as described above.

If the core particle 12 of the cathode material used in a battery includes nickel ions $NO^+$, the surface of the material including nickel ions $NO^+$ easily absorbs water, so as to form $Li_2CO_3$ and LiOH on the surface of the core particle. Therefore, $CO_2$ gas will be generated when the battery is charged, which will cause expansion of the sealed battery and affect the safety of the battery. The generated gas will also increase the interval distance between the core particles 12, which will affect the electron conducting path and increase the impedance between the core particles 12, or even destroy the electron conducting path to cause short circuit. Thus, the core particle 12 of the cathode material including nickel ions $NO^+$ may have poor electron conduction. For the core particles 12, once the conduction of electrons is blocked, the conduction of lithium ions will also be affected. According to some embodiments of the present disclosure, the organic-inorganic composite layer 14 can effectively inhibit reaction between the core particle (such as including nickel ions $NO^+$) and the electrolyte in the solution, and prevent the generation of unnecessary gas, thereby slowing down the aging of the material and increasing the extraction rate of the capacitance.

In some other embodiments, the core particle 12 includes manganese ions (e.g. $Mn^{3+}$). The manganese ions $Mn^{3+}$ easily causes a phase change on the surface of the core particle 12 and forms manganese ions $Mn^{2+}$. If manganese ion $Mn^{2+}$ continues to elute, it will move to the anode and form manganese atoms on the anode. As the amount of manganese atoms deposited on the anode increases, dendroid conducting filaments will generate and pass through the separator, and then reach the cathode. This is the so-called micro-short-circuit phenomenon. Once the micro-short-circuit occurs, self-discharge of the battery will start and the capacitance will continue to decline. According to some embodiments of the present disclosure, the functional groups of the nitrogen-containing hyperbranched polymer in the organic-inorganic composite layer 14 can chelate and coordinate with metal ions, so as to effectively suppress the phase change and formation of manganese ions $Mn^{2+}$ on the surface of the core particles.

In addition, a composite layer on the surface of the core particle of the core-shell structure in accordance with some embodiments includes two or more than two material layers.

Figure 2:
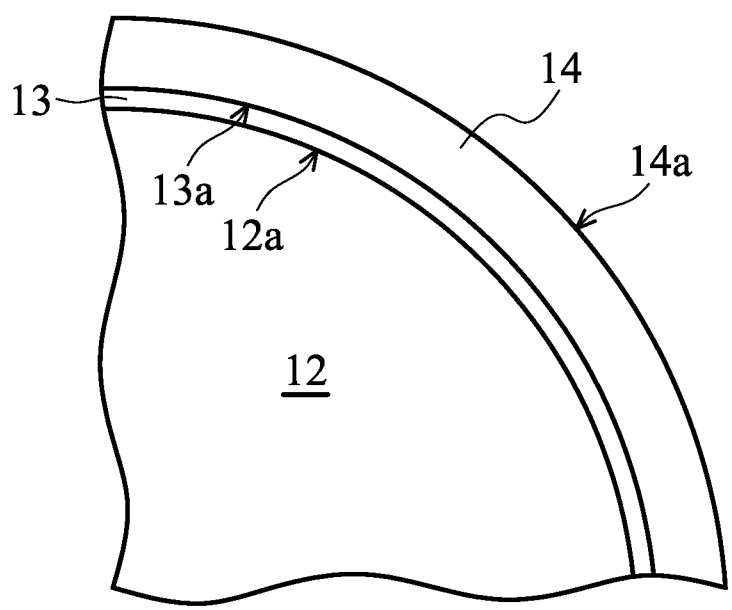
FIG. 2 is a partial schematic view of another core-shell structure, in accordance with some embodiments of the present disclosure.

FIG. 2 is a partial schematic view of another core-shell structure, in accordance with some embodiments of the present disclosure. Compared with the core-shell structure shown in FIG. 1, the core-shell structure 10' in FIG. 2 further includes an organic polymer layer 13 covering the surface 12a of the core particle 12, wherein the organic polymer layer 13 is formed between the core particle 12 and the organic-inorganic composite layer 14. The organic polymer layer 13 functioning as another barrier to prevent erosion of the core particle 12 by the electrolyte, and also prevent metal ions of the core particle 12 from dissolving. For example, the organic polymer layer 13 can prevent phase change of manganese ions (such as $Mn^{2+}$) on the surface of the core particle 12 and dissolution of the manganese ions.

As shown in FIG. 2, the organic polymer layer 13 covers the surface 12a of the core particle 12, and the organic-inorganic composite layer 14 directly coats on the surface 13a of the organic polymer layer 13. In some embodiments, the organic polymer layer 13 includes a nitrogen-containing and benzene ring-containing polymer. The nitrogen-containing and benzene ring-containing polymer may include bis-maleimide polymer, polyimide, or an imide-based interpenetrating polymer network (IPN) material.

According to the aforementioned descriptions, the core-shell structure in some embodiments can inhibit reaction between the core particle (e.g. the surface of the high-nickel cathode material having $NO^+$) and the electrolyte, so as to protect the outer surface of the core particle. Also, the core-shell structure in some embodiments does effectively reduce the surface phase change as well as the expansion and contraction rate of the cathode material. Therefore, when the core-shell structure of the embodiments is applied to a battery, the life cycles and the safety of the battery at high temperature can be greatly improved.

In the core-shell structure of some embodiments, the ion-conducting material of the organic-inorganic composite layer 14 has at least ion-conducting properties, thereby enhancing the conductivity of lithium ions of the core particle 12. In some embodiments, the lithium-containing linear polymer, such as a copolymer of thiophene structure containing lithium sulfonate, is used as the ion-conducting material. The copolymer of thiophene structure containing lithium sulfonate has an ion-conducting segment and an electron-conducting segment, so that the organic-inorganic composite layer 14 on the surface of the core particle 12 has good electron-conducting properties and good ion-conducting properties simultaneously. By applying the organic-inorganic composite layer 14 having good ion-conducting and electron-conducting properties, the effect of an organic-inorganic composite layer on the specific capacity and the effect of energy density on the cathode material can be reduced, thereby improving the charge and discharge performance of the battery in the application. In some other embodiments, when the lithium-containing linear polymer of the organic-inorganic composite layer 14 basically has the ion-conducting segment or the modified Prussian blue basically has ion-conducting group, the organic-inorganic composite layer 14 can have good ion-conducting and electron-conducting properties by adding one or more conductive materials (such as conductive additives and/or conductive polymers) in the organic-inorganic composite layer 14.

In addition, a composite layer on the surface of the core particle of the core-shell structure, in accordance with some other embodiments, includes three material layers.

Figure 3:
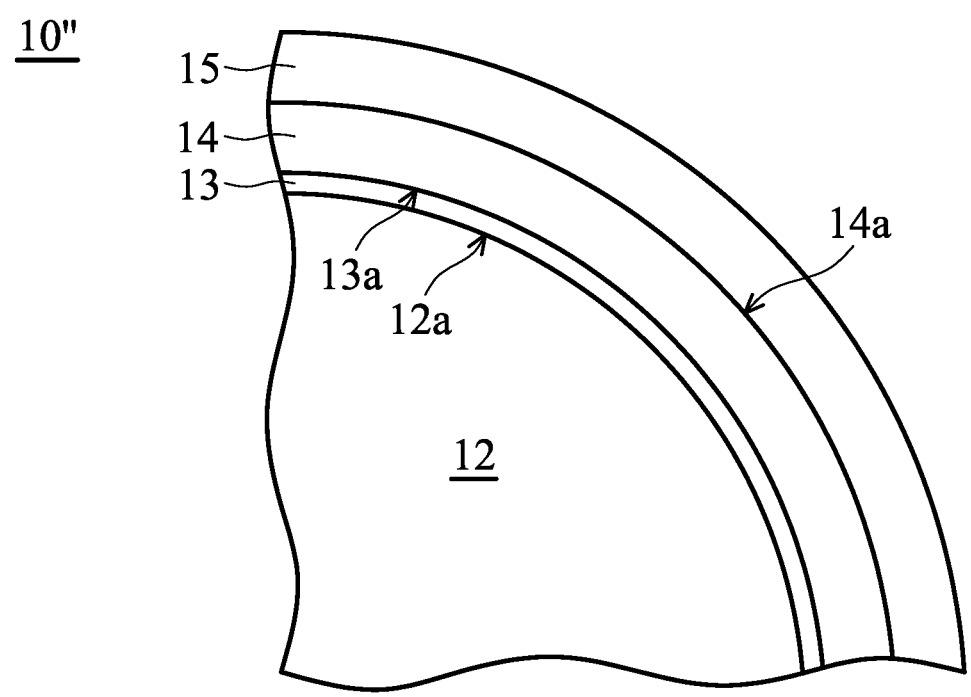
FIG. 3 is a partial schematic view of a further core-shell structure, in accordance with some embodiments of the present disclosure.

FIG. 3 is a partial schematic view of a further core-shell structure, in accordance with some embodiments of the present disclosure. Compared with the core-shell structure shown in FIG. 2, the core-shell structure 10" in FIG. 3 further includes an adhesive layer 15 coated on the surface 14a of the organic-inorganic composite layer 14. The core-shell structure 10" having the adhesive layer 15 can adhere to each other directly by a pressing process (such as calendering), so as to form a current collector-free electrode. Accordingly, the problem of coating a uniform film of the cathode material on the current collector using the traditional slurry-mixing process can be solved. The materials and preparation methods of the core particle 12, the organic polymer layer 13 and the organic-inorganic composite layer 14 in FIG. 3 have been described above and are not repeated herein.

In some embodiments, the adhesive layer 15 shown in FIG. 3 includes an adhesive and the second conductive additive. In some embodiments, the adhesive includes polyvinylidene fluoride (PVDF), polyvinylpyrrolidone (PVP), or a combination thereof. The second conductive additive may include one or more conductive carbon materials. The conductive carbon material may include conductive carbon black (such as Super P, available from Timcal Co.), conductive graphite flakes, carbon nanotubes (CNT), graphene, or a combination thereof.

In addition, the adhesive layer 15 may further includes a solid-state electrolyte, in accordance with some embodiments of the present disclosure. The solid-state electrolyte may be made of or include lithium aluminum titanium phosphate (LATP, also known as $Li_{1+x}Al_xTi_{2-x}(PO_4)_3$ type of solid-state electrolyte), tantalum-doped lithium lanthanum zirconate (LLZTO, also known as $Li_7La_3Zr_{2-x}Ta_xO_{12}$ type of solid-state electrolyte), lithium aluminum germanium phosphate (LAGP, also known as $Li_{1.5}Al_{0.5}Ge_{1.5}(PO_4)_3$ type of solid-state electrolyte), lithium ion conductive glass ceramics (LLOGS, also known as $Li_2O$—$Al_2O_3$—$SiO_2$—$P_2O_5$—$TiO_2$—$GeO_2$ type of solid-state electrolyte), or a combination thereof.

Thus, as shown in FIG. 3, the core-shell structure 10″ including the adhesive layer 15, in accordance with some embodiments, not only has the advantages of the core-shell structure 10′ in FIG. 2 as described above, but also can be processed by simply directly pressing (such as calendering), so as to form a current collector-free electrode that contains uniformly distributed core-shell structures. Also, the core-shell structure in some embodiments is suitable for being the cathode material of a solid-state battery by adding a solid-state electrolyte in the adhesive layer 15 of the core-shell structure.

Also, according to some embodiments of the core-shell structure, the composite layer on the surface of the core particle (containing, for example, high-nickel cathode material) does not need to be too thick to have those aforementioned excellent advantages of chemical resistance, protection and reduction of structural expansion and contraction. In some embodiments, the thickness of the composite layer is in a range of about 20 nm to about 200 nm.

Also, according to some embodiments of the core-shell structure, the organic polymer layer 13 on the surface of the core particle does not need to be too thick to have the protection effect that prevents the reaction between the core particle (containing, for example, high-nickel cathode material) and the electrolyte. If the organic polymer layer 13 is too thick, it does not affect the conduction of lithium ions, but it may affect the conduction of electrons.

In some embodiments, the thickness t2 of the organic-inorganic composite layer 14 or the thickness t3 of the adhesive layer 15 can be greater than the thickness t1 of the organic polymer layer 13. In some embodiments, the thickness t1 of the organic polymer layer 13 is in a range of about 5 nm to 10 nm, the thickness t2 of the organic-inorganic composite layer 14 is in a range of about 15 nm to 75 nm, and the thickness t3 of the adhesive layer 15 is in a range of about 25 nm to 100 nm. It should be noted that those numerical values of the thicknesses of the material layers are provided merely as examples, and not for limiting the scope of the present disclosure. The thickness of each material layer of the embodiments can be varied and determined based on the requirements in the applications.

According to some embodiments of the present disclosure, the solid-state electrolyte is added to the adhesive layer 15 (shown in FIG. 3). However, the disclosure is not limited in this illustrating example. In some other embodiments, a layer of solid-state electrolyte can be coated on the core made of the high-nickel cathode material, wherein the core and the solid-state electrolyte can be regarded as the core particle in the aforementioned embodiment. Then, several material layers, such as the organic polymer layer 13, the organic-inorganic composite layer 14, and the adhesive layer 15, are sequentially formed on the surface of the solid-state electrolyte. The present disclosure does not limit the stages at which the solid-state electrolyte is formed on the core particle.

Furthermore, according to the embodiments of the present disclosure, the surface of each core particle (containing, for example, high-nickel cathode material) can be coated with one or more material layers in many different ways. For example, after the core particles are added to the solvent (including to-be-coated material) to form a solution, the solution is uniformly stirred for a period of time. Then, the solvent exits through a vacuum exhaust device. The solution is continuously stirred during the removal of the solvent. Then, the particles covered by the material layer are dried and collected at a high temperature. In some other embodiments, after a uniformly mixed solution (including the core particles and the to-be-coated material) is formed, a spray granulation method can be utilized in conjunction with a drying system to produce and collect the particles, wherein each particle include a core and one or more material layers on the surface of the core. In addition, the same or different manufacturing methods can be utilized to complete the coating of different material layers and the granulation. The disclosure does not limit the method for material coating and granulation of the core-shell structure.

Below, exemplary embodiments and comparative examples will be provided for describing the preparation of a copolymer having a thiophene structure with a lithium sulfonate as one of the ion-conducting materials in detail, so that the embodiments may be easily realized by a person having ordinary knowledge in the art. The copolymer having a thiophene structure with a lithium sulfonate has both ion-conducting properties and electron-conducting properties.

<Preparation of Ion-Conducting Material: Thiophene-Containing Copolymer Structure with Lithium Sulfonate>

(A) Synthesis of Ionic Conductive Polymer P3 ST Represented by Formula (6)

Synthetic steps for producing ionic conductive polymer P3 ST represented by formula (6) was presented as follow:

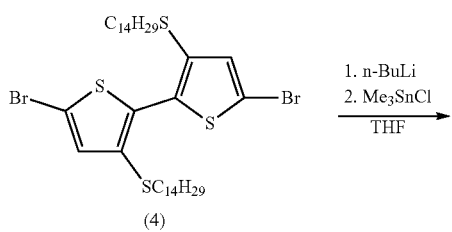

(4)

-continued

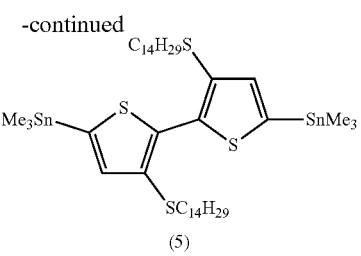

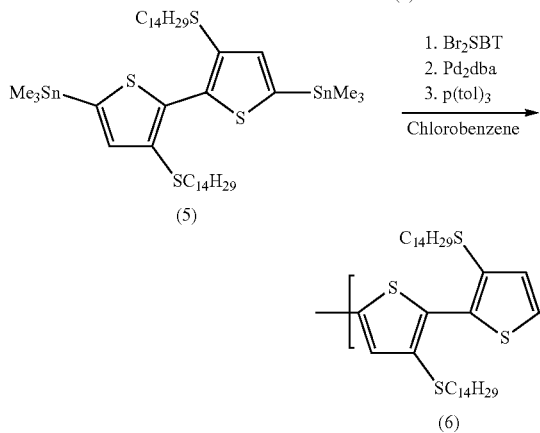

The compounds represented by formula (4), (5) and (6) can be prepared with the steps described below.

Firstly, under anhydrous oxygen-free conditions, 2.5 M n-butyllithium (n-BuLi) (2.33 ml in hexane, 5.82 mmol) was added to 5,5'-dibromo-3,3'-bis(tetradecylthio)-2,2'-bithiophene (represented by formula (4), and available from Tokyo Chemical Industry Co. Ltd) (1.34 g, 5.82 mmol)/ tetrahydrofuran (THF) (30 ml) at 78° C. to form a mixture, and the mixture was stirred for two hours at room temperature. Then, trimethyltin chloride ($Me_3SnCl$) was added to the mixture at room temperature, and the mixture was heated with reflux to accelerate the reaction for 12 hours. After reaction, deionized water was added to the mixture to form a solution. The solution was extracted with ether and deionized water, and the organic layer was collected. The organic layer was concentrated by a rotary concentrator to remove the solvent, and then purified by column chromatography (eluent: hexane), thereby obtainnig a white solid product of 3,3'-bis(tetradecylthio)-[2,2'-bithiophene]-5,5'-diyl)bis (trimethyl stannane (represented by formula (5)).

Next, under anhydrous oxygen-free conditions, tri(o-tolyl)phosphine (58 mg, 0.192 mmol) was added to 5,5'-dibromo-3,3'-bis(tetradecylthio)-2,2'-bithiophene (represented by formula (4)) (0.30 g, 0.384 mmol)/30 ml of chlororbenzene and 3,3'-bis(tetradecylthio)-[2,2'-bithiophene]-5,5'diyl)Bis(trimethyl stannane) (represented by formula (5)) at room temperature to form a mixture, and the mixture was stirred for 5 minutes. Then, tris(dibenzylideneacetone)-dipalladium(0) (17.5 mg, 0.019 mmol) was further added to the mixture at room temperature, and the mixture was stirred for 5 minutes. Then, the mixture was heated to 120° C. to react for 48 hours. At the end of the reaction, 2-bromothiophene (0.35 ml) was added at 120° C.

and stirred for 15 minutes, and trimethyl(thiophen-2-yl) stannane (0.35 ml) was further added at 120° C. and stirred for another 15 minutes to form a solution. Then, the solution was cooled to room temperature. 50 ml of methanol (MeOH) and 20 ml of concentrated hydrochloric acid were added to the solution, and the solution was filtered to obtain a solid material. The solid material was purified by Soxhlet extraction method. In this example, the solid material was sequentially extracted with hexane, methylene chloride, chloroform and chlorobenzene. The extracted polymer was washed with acetone, followed by filtering to produce a product of ionic conductive polymer P3 ST (represented by formula (6)). The product was a film-like purple-black solid.

(B) Synthesis of Ionic Conductive Polymer P3ST-T2 Represented by Formula

Synthetic steps for producing ionic conductive polymer P3 ST-T2 represented by formula (11) were presented as follow:

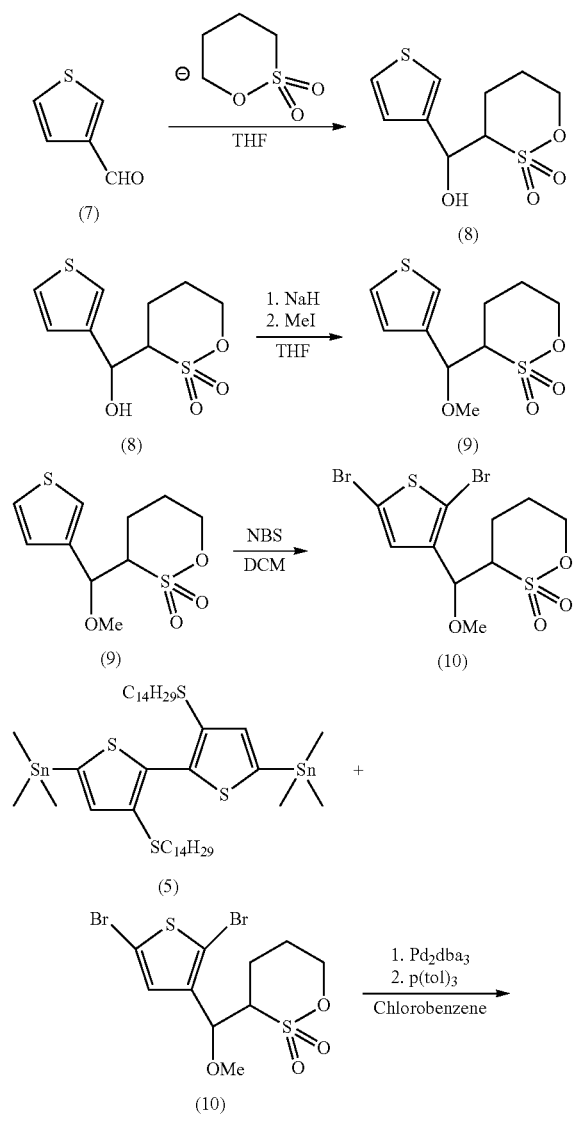

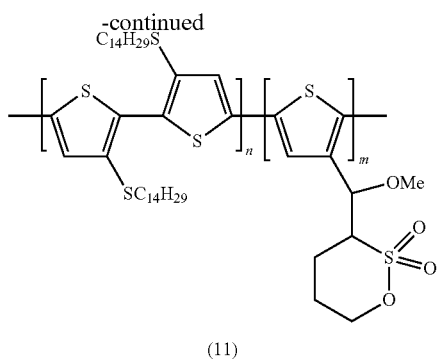

(11)

The compounds represented by formula (7), (8), (9), (10) and (11) could be prepared with the steps described below.

Firstly, under anhydrous oxygen-free conditions, 2.5 M n-butyllithium (n-BuLi) (43.0 ml in hexane, 0.108 mol) was slowly added to 1,2-oxathiane 2,2-dioxide (13.96 g, 0.102 mol)/tetrahydrofuran (THF) (300 ml) at 70° C. to form a mixture, and the mixture was reacted for one hour at 70° C. Thiophene-3-carbaldehyde (represented by formula (7); available from Sigma-Aldrich Corporation) (11.50 g, 0.102 mol) was slowly added to the mixture at 70° C. to form a solution, and the solution was reacted for half hour at 70° C. After the solution was cooled to room temperature, the reaction continues for 6 hours, and the solution gradually became transparent yellow. After the reaction was completed, hydrochloric acid was added cautiously until the solution was neutral. This neutral solution was extracted with deionized water (DI water) and ether, and the solution was concentrated by a rotary concentrator to remove the solvent. The residuals were purification by column chromatography (eluent: hexane: ethyl acrylate (EA)=70:30), and then recrystallized to obtain a product of 3-(hydroxy(thiophen-3-yl)methyl)-1,2-oxathiane 2,2-dioxide (represented by formula (8)) (white solid).

Next, under anhydrous oxygen-free conditions, 3-(hydroxy(thiophen-3-yl)methyl)-1,2-oxathiane 2,2-dioxide (represented by formula (8)) (19.1 g, 0.077 mol) was added to 60% of sodium hydride (2.21 g, 0.092 mol)/tetrahydrofuran (THF) (150 ml) at 0° C. to form a mixture, and the mixture was reacted for half hour at 0° C. 95% of methyl iodide (MeI) (13.80 g, 0.092 mol) was added to the mixture at 0° C. to form a solution, and the solution was reacted for 10 minutes at 0° C. After the solution was cooled to room temperature, the reaction continues for half hour. After the reaction was completed, the salts were filtered directly with filter plates, and the solvent was removed by a rotary concentrator. Then, purification was performed by column chromatography (eluent: hexane: ethyl acrylate (EA)=75:25) to obtain a product of 3-(methoxy(thiophen-3-yl) methyl)-1,2-oxathiane 2,2-dioxide (represented by formula (9)) (yellow liquid).

Next, N-bromosuccinimide (NBS) (9.8 g, 0.055 mmol) was added to 3-(methoxy(thiophen-3-yl)methyl)-1,2-oxathiane 2,2-dioxide (represented by formula (9)) (5.8 g, 0.022 mol)/tetrahydrofuran (THF) (100 ml) at room temperature to form a mixture, and the mixture was reacted by refluxing for 12 hours at 60° C. After the reaction was completed, the salts were filtered with filter plates, and the solvent was removed by a rotary concentrator. Then, purification was performed by column chromatography (eluent: hexane: ethyl acrylate (EA)=80:20) to produce a yellow viscous liquid. The yellow viscous liquid was recrystallized to obtain a product of 3((2,5-dibromothiophen-3-yl) (methoxy)methyl)-1,2-oxathiane 2,2-dioxide (represented by formula (10)) (white solid).

Next, under anhydrous oxygen-free conditions, 5,5'-dibromo-3,3'-bis(tetradecylthio)-2,2'-bithiophene (represented by formula (4)) (0.16 g, 0.381 mmol)/30 ml of chlorobenzene and 3-((2,5-dibromothiophen-3-yl) (methoxy)methyl)-1,2-oxathiane 2,2-dioxide (represented by formula (10)) (0.16 g, 0.382 mmol)/30 ml of chlorobenzene were added to tri(o-tolyl)phosphine) (0.017 g, 0.019 mmol)/30 ml of chlorobenzene at room temperature, and stirred for 5 minutes. Then, tris(dibenzylideneacetone)-dipalladium(0)) (0.057 g, 0.19 mmol)/30 ml of chlorobenzene was added and stirred for 5 minutes to form a mixture. Then, the mixture was heated to 120° C. to react for 72 hours. At the end of the reaction, 2-bromothiophene (0.35 ml) was added at 120° C. and stirred for 15 minutes, and trimethyl(thiophen-2-yl) stannane (0.35 ml) was further added at 120° C. and stirred for another 15 minutes to form a solution. Then, the solution was cooled to room temperature. 50 ml of methanol (MeOH) and 20 mL of concentrated hydrochloric acid were added to the solution, and the organic layer was collected and concentrated by a rotary concentrator. Afterwards, all solvents were distilled off by reduced pressure distillation. The solid material as obtained was purified by Soxhlet extraction method. Firstly, the solid material was washed with hexane to remove the low molecular weight polymers, and then washed with ether to produce a raw product. The raw product was dissolved with an appropriate amount of ether, followed by adding a large amount of hexane for recrystallization. After recrystallization, the solid as obtained was purified by Soxhlet extraction method to produce a product, wherein the solid was sequentially extracted with hexane and ether, and the product was dark red solid (0.1 g, 30%)). In the product represented by formula (11), m and n were positive integers, each greater than 30, and Me was a methyl group. In one example, each of m and n was greater than 50 and no more than 100 (50<m≤100, 50<n≤100), wherein m and n were positive integers. By repeating the above synthesis steps, more than 1 g of ionic conductive polymer P3ST-T2 (represented by formula (11)) could be collected.

(C) Synthesis of Thiophene-Containing Copolymer Structure with Lithium Sulfonate (Represented by Formula (12))

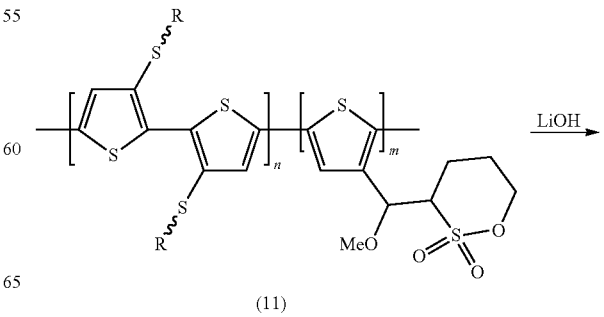

(11)

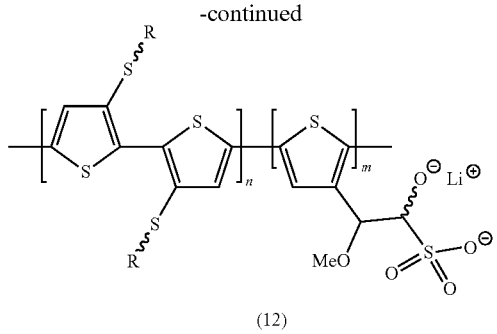

(12)

Figure 4:
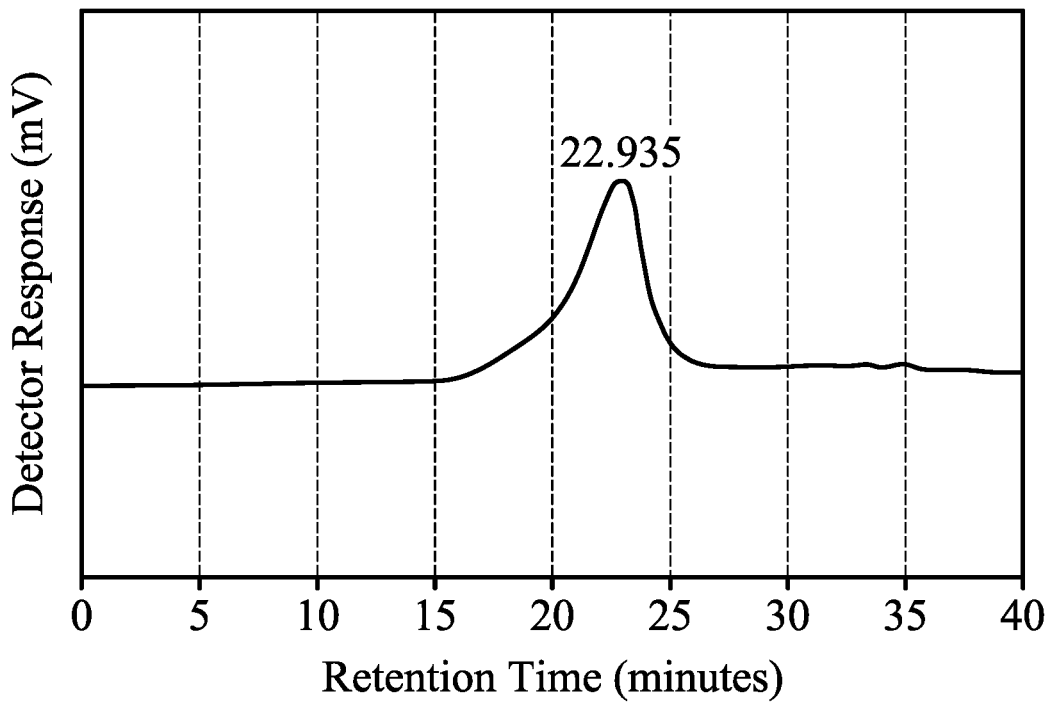
FIG. 4 is a graph of gel permeation chromatography (GPC) data of a copolymer having a thiophene structure with a lithium sulfonate (ionic P3 ST-T2), in accordance with some embodiments of the present disclosure.

Lithium hydroxide (LiOH) (0.0015 g, 0.06 mmol) was added to 30 mL of deionized water containing the ionic conductive polymer P3 ST-T2 (represented by formula (11), wherein R=$C_{14}H_{29}$) (1 g, 0.0207 mmol) prepared above to form a mixture. Then, the mixture was stirred at room temperature for 24 hours to perform lithiated displacement reaction. Samples were taken from time to time during the reaction, and gel permeation chromatography (GPC) was used for GPC analysis as the basis for the initial determination of the degree of reaction. FIG. 4 is a graph of gel permeation chromatography (GPC) data of a copolymer having a thiophene structure with a lithium sulfonate (represented by formula (12)), in accordance with some embodiments of the present disclosure. As shown in FIG. 4, GPC data was presented as a graph of detector response (or sensitivity) (millivolts; mV) (y-axis) against retention time (x-axis) (minutes). The graph of GPC data provided a spectrum of peaks for a sample representing the analytes in a sample eluting from the column at different times. After the reaction was completed, all solvents were distilled off by reduced pressure distillation. The solid material as obtained was purified by Soxhlet extraction method. Firstly, the solid material was washed with hexane to remove the low molecular weight polymers, and then washed with ether to produce a raw product. The raw product was dissolved with an appropriate amount of ether, followed by adding a large amount of hexane for recrystallization. After recrystallization, the solid as obtained was purified by Soxhlet extraction method to produce a product, wherein the solid was sequentially extracted with hexane and ether. The product was a white solid of copolymer having a thiophene structure with a lithium sulfonate (represented by formula (12)), wherein n is greater than 30 and m is greater than 30. The copolymer having a thiophene structure with a lithium sulfonate has an electron mobility exceeding 0.1 $cm^2/Vs$ (>0.1 $cm^2/Vs$). Also, the ionic groups $O^-$ and $SO^{3-}$ of the copolymer having a thiophene structure with a lithium sulfonate could prevent erosion by fluoride ion (F), improve the stability of the material layers and also increase the conductivity of lithium ions.

In additions, operation conditions of gel permeation chromatography (GPC) analysis performed in the embodiments are provided herein: (1) a GPC system formed by connecting four columns of Shodex KD-801/KD802/KD-802/KD 802.5 as a series; (2) a solvent system containing dimethylformamide (DMF); (3) the flow rate of 0.8 ml/min for analytical columns; and (4) oven temperature of 40.0° C., wherein the oven was used to heat and maintain the temperature in a GPC separation.

The copolymer having a thiophene structure with a lithium sulfonate (represented by formula (12)) was the lithium-containing linear polymer represented by formula (1) in the aforementioned embodiments.

The following describes how to bond the ion-conducting material to the nitrogen-containing hyperbranched polymer to form a composite of the organic-inorganic composite layer 14, in accordance with some embodiments of the present disclosure.

One of the synthesis methods is described below. The nitrogen-containing hyperbranched polymer (acting as a matrix for carrying the ion-conducting material) was formed by bismaleimide represented by formula (13) copolymerized with barbituric acid represented by formula (14). Then, the nitrogen-containing hyperbranched polymer was reacted with the copolymer having a thiophene structure with a lithium sulfonate represented by formula (12) to form a compound of the organic-inorganic composite layer 14. Two synthesis examples provided below describe the preparations of two nitrogen-containing hyperbranched polymers each including the aforementioned copolymer having a thiophene structure with a lithium sulfonate (represented by formula (12)).

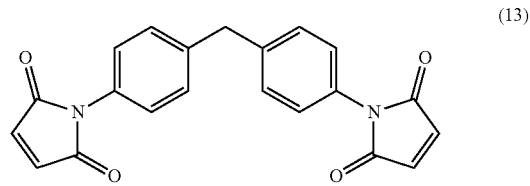

(13)

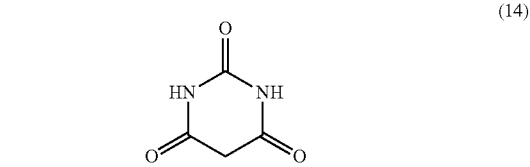

(14)

<Composite 1: Nitrogen-Containing Hyperbranched Polymer Linked with Thiophene-Containing Copolymer Structure with Lithium Sulfonate>

1.312 g (3.66 mmol) of N,N'-bismaleimide-4,4'-diphenylmethane (CAS no.: 13676-54-5) (represented by formula (13)) and 0.234 g (1.83 mmol) of barbituric acid (CAS no.: 67-52-7) (represented by formula (14)) were added to 50 g of N-methyl pyrrolidone (NMP; CAS no.: 872-50-4), and stirred at room temperature to dissolve. The solution was yellow and clear after dissolution. Then, 0.25 g (0.005 mmol) of the copolymer having a thiophene structure with a lithium sulfonate (represented by formula (12)) was added to the solution, and the solution was continuously stirred. Because the copolymer having a thiophene structure with a lithium sulfonate (represented by formula (12)) was not soluble in N-methyl pyrrolidone (NMP), it was dispersed in the solution containing N,N'-bismaleimide-4,4'-diphenylmethane and barbituric acid. The reactor was then placed in an oil bath and heated. When the temperature of the solution gradually increased, the color of the solution gradually turned brown. When the temperature of the solution reached 100° C., the copolymer having a thiophene structure with a lithium sulfonate (represented by formula (12)) gradually aggregated. When the temperature of the solution reached 115° C., the copolymer having a thiophene structure with a lithium sulfonate (represented by formula (12)) appeared as small clusters. When the temperature of the solution reached 120° C., the copolymer having a thiophene structure with a lithium sulfonate (represented by formula (12)) agglomerated and presented a phenomenon of large clumps. If the temperature of the reactor continued to rise, the copolymer having a thiophene structure with a lithium sulfonate (represented by formula (12)) was gradually linked to the nitrogen-containing hyperbranched polymer (formed by reacting N,N'-bismaleimide-4,4'-diphenylmethane with barbituric acid), and the large clumps in the solution gradually shrunk. When the temperature of the solution reached 130° C., the whole solution appeared brown and clear, and no undissolved granular powder was observed. Samples were taken from time to time during the reaction, and gel permeation chromatography (GPC) was used for GPC analysis as the basis for the initial determination of the degree of reaction.

Figure 5:
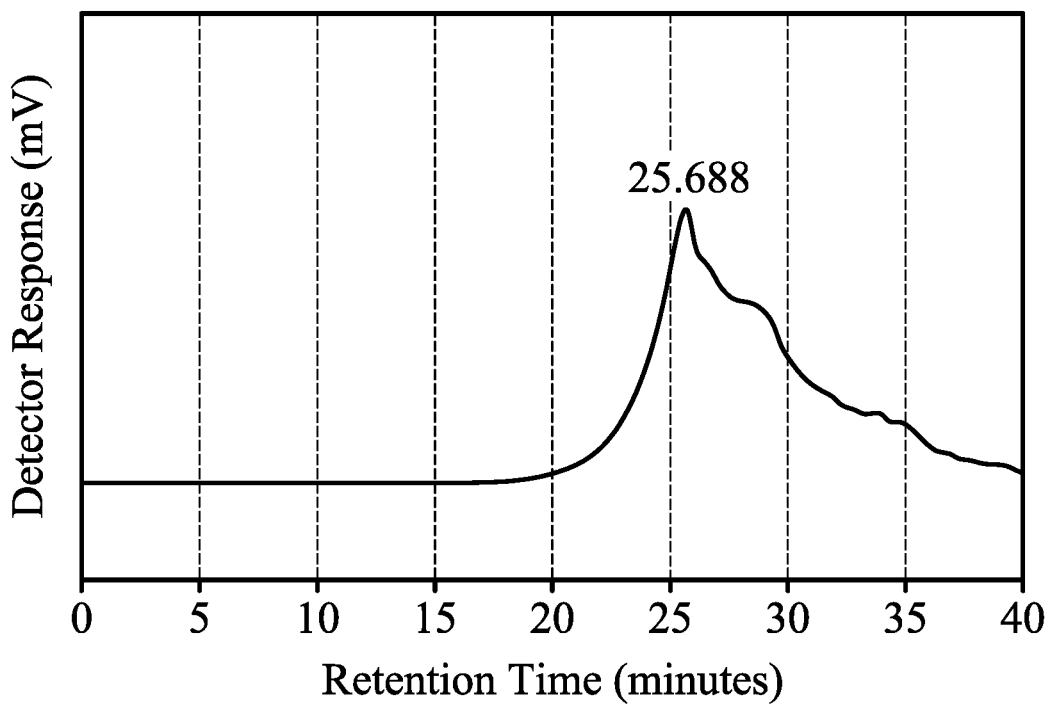
FIG. 5 is a graph of gel permeation chromatography (GPC) data of composite 1 including the nitrogen-containing hyperbranched polymer linked with a copolymer having a thiophene structure with a lithium sulfonate (ionic P3ST-T2), in accordance with some embodiments of the present disclosure.

FIG. 5 is a graph of gel permeation chromatography (GPC) data of composite 1 including the nitrogen-containing hyperbranched polymer linked with copolymer having a thiophene structure with a lithium sulfonate (represented by formula (12)), in accordance with some embodiments of the present disclosure. As shown in FIG. 5, GPC data was presented as a graph of detector response (or sensitivity) (y-axis) against retention time (x-axis). Operation conditions of gel permeation chromatography (GPC) analysis performed in the embodiments have been described above, and not repeated herein.

Reaction of the solution continued for 48 hours at 130° C. The heating was stopped and the reactor in the oil bath was removed. The solution in the reactor was continuously stirred until the temperature of the solution dropped to room temperature. Then, the solution in the reactor was poured into a collection flask to produce 5 wt % of solution of composite 1 that contains copolymer having a thiophene structure with a lithium sulfonate (represented by formula (12)) linked to nitrogen-containing hyperbranched polymer. In other words, the content of this solution (non-solvent) was the composite 1 that contains the nitrogen-containing hyperbranched polymer and the copolymer having a thiophene structure with a lithium sulfonate linked to the nitrogen-containing hyperbranched polymer.

<Composite 2: Nitrogen-Containing Hyperbranched Polymer Linked with Copolymer Having a Thiophene Structure with a Lithium Sulfonate>

1.312 g of oligomer of phenylmethane maleimide (CAS no.: 67784-74-1) and 0.234 g (1.83 mmol) of barbituric acid (CAS no.: 67-52-7) were added to 50 g of N-methyl pyrrolidone (NMP), and stirred at room temperature to dissolve. The solution was yellow and clear after dissolution. Then, 0.5 g (0.01 mmol) of the copolymer having a thiophene structure with a lithium sulfonate (represented by formula (12)) was added to the solution, and the solution was continuously stirred. Because the copolymer having a thiophene structure with a lithium sulfonate (represented by formula (12)) was not soluble in N-methyl pyrrolidone (NMP), it was dispersed in the solution containing oligomer of phenylmethane maleimide and barbituric acid. The reactor was then placed in an oil bath and heated. When the temperature of the solution gradually increased, the color of the solution gradually turned brown. When the temperature of the solution reached 100° C., the copolymer having a thiophene structure with a lithium sulfonate (represented by formula (12)) gradually aggregated. When the temperature of the solution reached 115° C., the copolymer having a thiophene structure with a lithium sulfonate (represented by formula (12)) appeared as small clusters. When the temperature of the solution reached 120° C., the copolymer having a thiophene structure with a lithium sulfonate (represented by formula (12)) agglomerated and presented a phenomenon of large clumps. If the temperature of the reactor continued to rise, the copolymer having a thiophene structure with a lithium sulfonate (represented by formula (12)) was gradually linked to the nitrogen-containing hyperbranched polymer (formed by reacting oligomer of phenylmethane maleimide with barbituric acid), and the large clumps in the solution gradually shrunk. When the temperature of the solution reached 130° C., the whole solution appeared brown and clear, and no undissolved granular powder was observed. Samples were taken from time to time during the reaction, and gel permeation chromatography (GPC) was used for GPC analysis as the basis for the initial determination of the degree of reaction. The GPC results were presented in FIG. 6.

Figure 6:
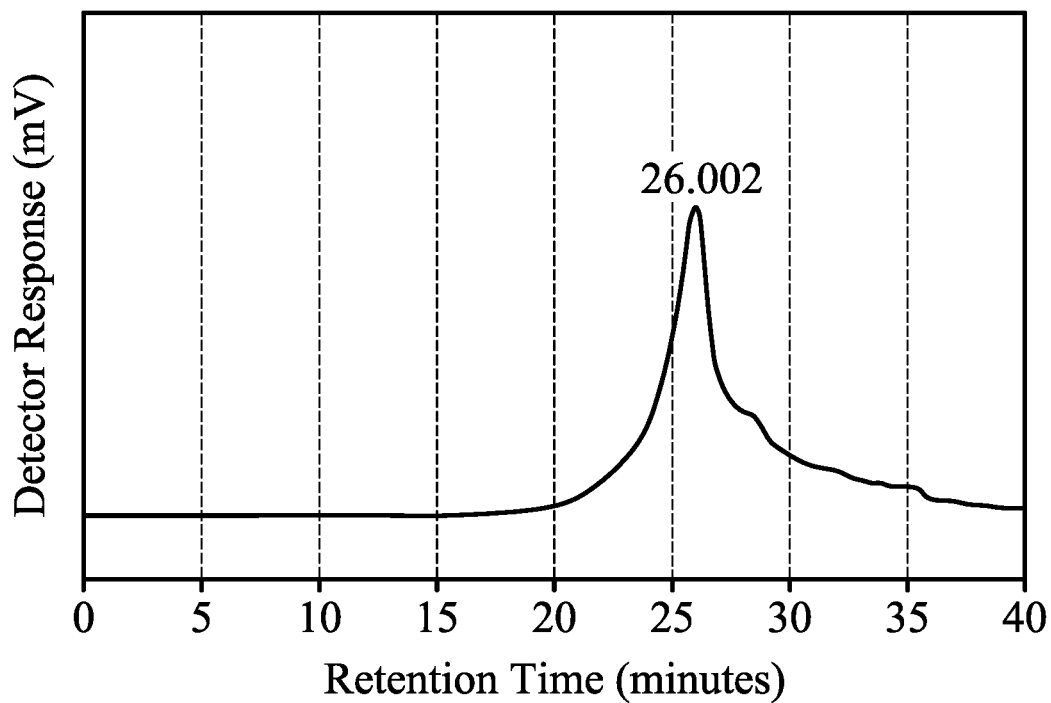
FIG. 6 is a graph of gel permeation chromatography (GPC) data of composite 2 including the nitrogen-containing hyperbranched polymer linked with a copolymer having a thiophene structure with a lithium sulfonate (ionic P3ST-T2), in accordance with some embodiments of the present disclosure.

FIG. 6 is a graph of gel permeation chromatography (GPC) data of composite 2 including the nitrogen-containing hyperbranched polymer linked with copolymer having a thiophene structure with a lithium sulfonate (represented by formula (12)), in accordance with some embodiments of the present disclosure. As shown in FIG. 6, GPC data was presented as a graph of detector response (or sensitivity) (y-axis) against retention time (x-axis). Operation conditions of gel permeation chromatography (GPC) analysis performed in the embodiments have been described above, and not repeated herein.

Reaction of the solution continued for 48 hours at 130° C. The heating was stopped and the reactor in the oil bath was removed. The solution in the reactor was continuously stirred until the temperature of the solution dropped to room temperature. Then, the solution in the reactor was poured into a collection flask to produce 3 wt % of solution of composite 2 that contains copolymer having a thiophene structure with a lithium sulfonate (represented by formula (12)) linked to nitrogen-containing hyperbranched polymer. In other words, the content of this solution (non-solvent) was the composite 2 that contains the nitrogen-containing hyperbranched polymer and the copolymer having a thiophene structure with a lithium sulfonate linked to the nitrogen-containing hyperbranched polymer.

In addition, as mentioned above, in some other embodiments, the modified Prussian blue could be used as the ion-conducting material, and the nitrogen-containing hyperbranched polymer acted as a carrier with that the modified Prussian blue was linked. The following were two synthetic examples to illustrate the methods for preparing two different nitrogen-containing hyperbranched polymers respectively linked with modified Prussian blue.

<(1) Preparation of Reaction Precursor Combination 1 of Nitrogen-Containing Hyperbranched Polymer and Modified Prussian Blue>

First, 78.50 g (0.138 mole) of bisphenol A diphenyether bismaleimide (CAS no.: 79922-55-7) and 21.5 g (0.138 mole) of 5,5-dimethylbarbituric acid (CAS no.: 24448-94-0) were separately ground to solid powders by a powder grinder, and then mixed together. Similarly, 10.36 g (0.012 mole) of pigment blue 27 (or so-called Prussian blue, $Fe_4[Fe(CN)_6]_3$) (CAS no.: 12240-15-2) and 14.62 g (0.145 mole) of potassium nitrate (KNO3, CAS no.: 7757-79-1) were separately ground to solid powders by the powder grinder, and then mixed together. Next, those powders were mixed and ground by the powder grinder to form a powder mixture. The obtained powder mixture was a reaction precursor combination of nitrogen-containing hyperbranched polymer and modified Prussian blue.

In some embodiments, Prussian blue ($Fe_4[Fe(CN)_6]_3$)) was modified by potassium nitrate ($KNO_3$) to form the modified potassium nitrate ($K_4Fe(CN)_6$). The weight percentages of potassium nitrate and Prussian blue may be 1.41 wt %: 1 wt %. In some other embodiments, if the modified Prussian blue was prepared as an aqueous solution, it had a solid content of 1.5%, a concentration of 20 mM, pH of 6.93, and a viscosity of 1.89 cPs at a shear rate of 100 l/sec.

<(2) Preparation of Polymer Solution 1 Containing Nitrogen-Containing Hyperbranched Polymer Linked with Modified Prussian Blue>

3.75 g of the above-mentioned reaction precursor combination 1 of nitrogen-containing hyperbranched polymer and modified Prussian blue as well as 71.25 g of NMP solvent were added to a 250 ml three-necked flask to form a solution, and the solution obtained was thoroughly stirring by a magnetic stir. The three-necked flask containing the NMP solution having reaction precursors was set into a rack of a reaction system, wherein the reaction system includes a condenser tube, a drying device, an oil bath, a heating device, an over-temperature protection device and a temperature probe. Also, the heating device was set at the synthesis temperature (i.e. 130° C.). Synthesis reaction was carried out at a controlled temperature, and the solution in the three-necked flask was continuously stirred during the synthesis reaction. Samples were taken from time to time during the reaction, and gel permeation chromatography (GPC) was used for GPC analysis as the basis for the initial determination of the degree of reaction. In some embodiments, the modified Prussian blue was represented by a molecular formula of $K_4Fe(CN)_6$.

Figure 7:
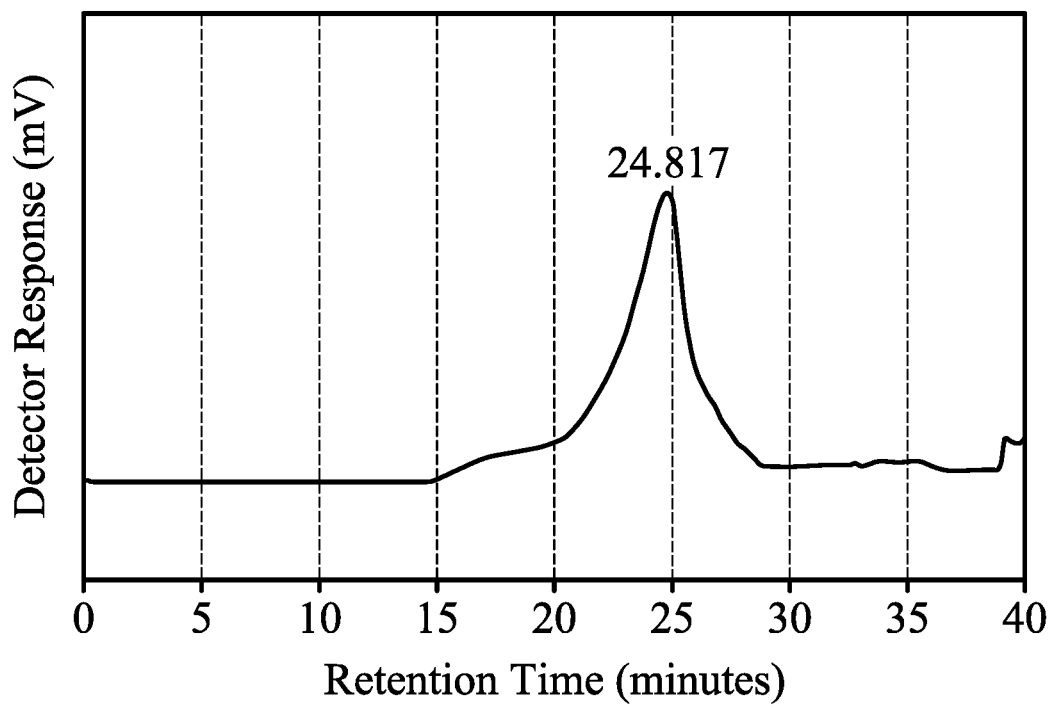
FIG. 7 is a graph of gel permeation chromatography (GPC) data of nitrogen-containing hyperbranched polymer solution 1 containing modified Prussian blue, in accordance with some embodiments of the present disclosure.

FIG. 7 is a graph of gel permeation chromatography (GPC) data of nitrogen-containing hyperbranched polymer solution 1 containing modified Prussian blue, in accordance with some embodiments of the present disclosure. As shown in FIG. 7, GPC data is presented as a graph of detector response (or sensitivity) (y-axis) against retention time (x-axis). Operation conditions of gel permeation chromatography (GPC) analysis performed in the embodiments have been described above, and not repeated herein.

During the reaction, the nitrogen-containing hyperbranched polymer gradually took shape, and the polymer structure as formed might have chelating effect to hold the modified Prussian blue. Therefore, the modified Prussian blue might be linked to nitrogen-containing hyperbranched polymer or embedded in the structure of nitrogen-containing hyperbranched polymer during the reaction. After the reaction continued for 64 hours at 130° C., the heating device was removed. When the solution temperature was dropped to room temperature, the solution was filtered to obtain 5 wt % of polymer solution 1 containing nitrogen-containing hyperbranched polymer linked with modified Prussian blue.

<(3) Preparation of Reaction Precursor Combination for Forming Nitrogen-Containing Hyperbranched Polymer 3>

71.68 g (0.2 mole) of oligomer of phenylmethane maleimide (CAS no.: 67784-74-1) and 14.42 g (0.1 mol) of 2-thiobarbituric acid (CAS no.: 504-17-6) were mixed together and ground by the powder grinder to form a powder mixture. The obtained powder mixture was a reaction precursor combination of nitrogen-containing hyperbranched polymer 3.

<(4) Preparation of Polymer Solution 2 Having Nitrogen-Containing Hyperbranched Polymer Linked with Modified Prussian Blue>

1 g of the above-mentioned reaction precursor combination 1 of nitrogen-containing hyperbranched polymer having modified Prussian blue was added to a 250 ml three-necked flask containing 50 g of nitrogen-containing hyperbranched polymer 3 (described later) in NMP solvent to form a solution, and the solution was thoroughly stirring by a magnetic stir. Then, the 250 ml three-necked flask that contains the NMP solution having reaction precursors combination 1 and nitrogen-containing hyperbranched polymer 3 was set into a rack of a reaction system, wherein the reaction system included a condenser tube, a drying device, an oil bath, a heating device, an over-temperature protection device and a temperature probe. Also, the heating device was set at the synthesis temperature (i.e. 130° C.). Synthesis reaction was carried out at a controlled temperature, and the solution in the three-necked flask was continuously stirred during the synthesis reaction. Samples were taken from time to time during the reaction, and gel permeation chromatography (GPC) was used for GPC analysis as the basis for the initial determination of the degree of reaction.

Figure 8:
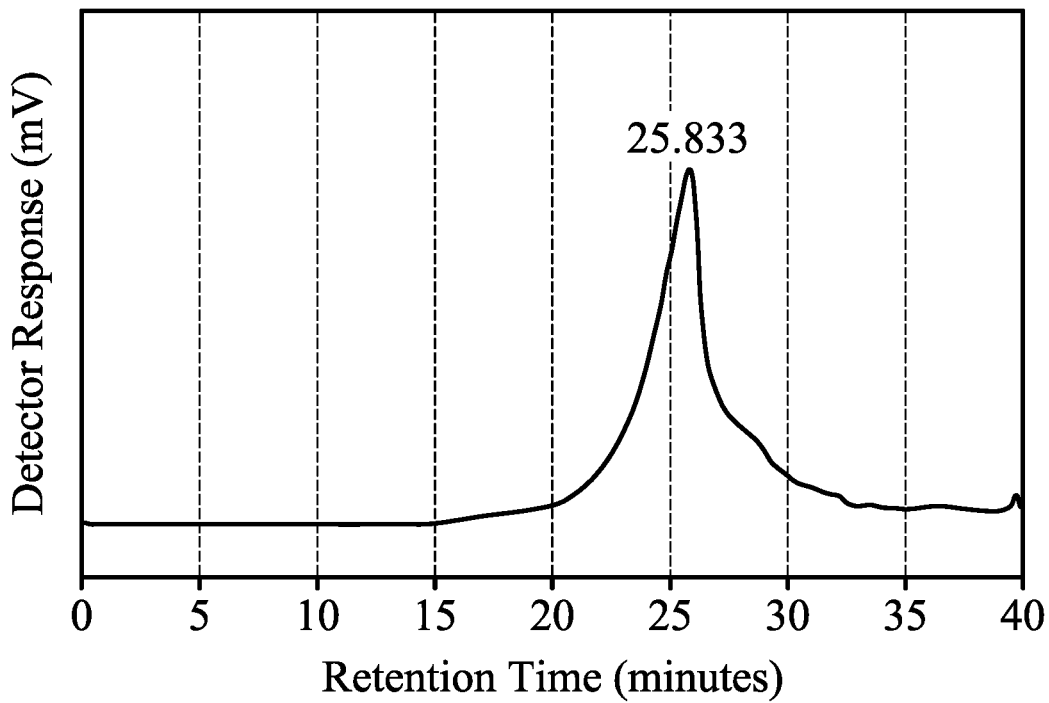
FIG. 8 is a graph of gel permeation chromatography (GPC) data of nitrogen-containing hyperbranched polymer solution 2 containing modified Prussian blue, in accordance with some embodiments of the present disclosure.

FIG. 8 is a graph of gel permeation chromatography (GPC) data of nitrogen-containing hyperbranched polymer solution 2 containing modified Prussian blue, in accordance with some embodiments of the present disclosure. As shown in FIG. 8, GPC data is presented as a graph of detector response (or sensitivity) (y-axis) against retention time (x-axis). Operation conditions of gel permeation chromatography (GPC) analysis performed in the embodiments have been described above, and not repeated herein.

During the reaction, the nitrogen-containing hyperbranched polymer gradually took shape, and the polymer structure as formed might have chelating effect to hold the modified Prussian blue. Therefore, the modified Prussian blue might be linked to nitrogen-containing hyperbranched polymer or embedded in the structure of nitrogen-containing hyperbranched polymer during the reaction. After the reaction continued for 48 hours at 130° C., the heating device was removed. When the solution temperature was dropped to room temperature, the solution was filtered to obtain 5 wt % of polymer solution 2 containing nitrogen-containing hyperbranched polymer linked with modified Prussian blue.

<(5) Preparation of Nitrogen-Containing Hyperbranched Polymer 3>

Figure 9:
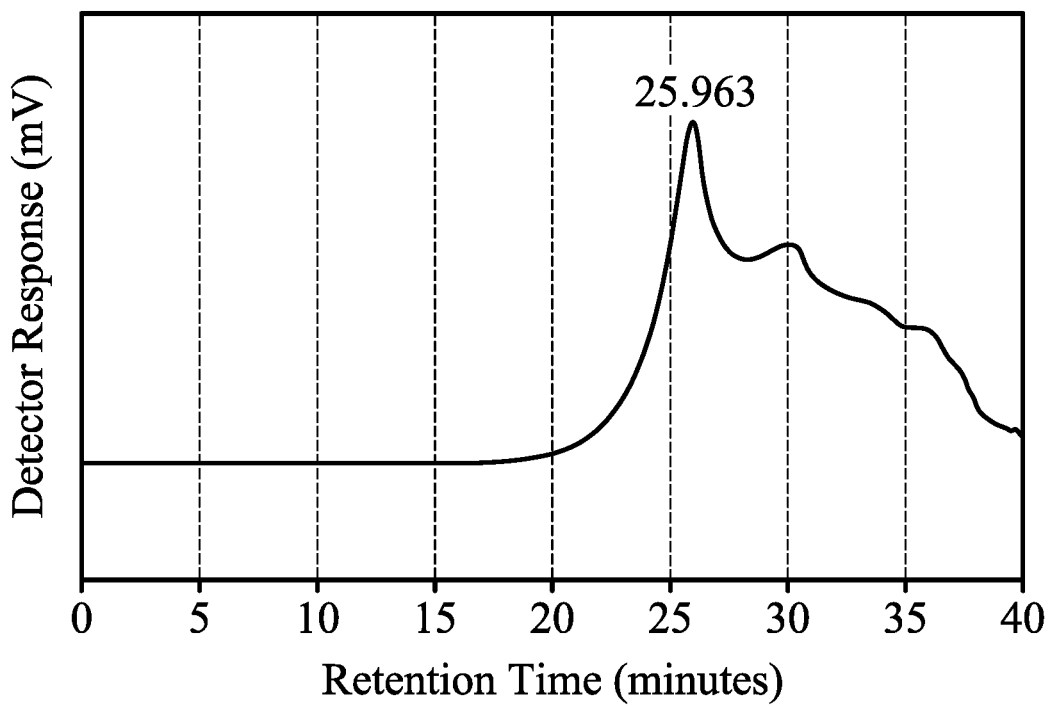
FIG. 9 is a graph of gel permeation chromatography (GPC) data of nitrogen-containing hyperbranched polymer solution 3, in accordance with some embodiments of the present disclosure.

1.5 g of the above-mentioned reaction precursor combination for forming nitrogen-containing hyperbranched polymer 3 and 48.5 g of NMP solvent were added to a 250 ml three-necked flask to form a solution, and the solution obtained was thoroughly stirring by a magnetic stir. The three-necked flask containing the NMP solution having reaction precursor combination for forming nitrogen-containing hyperbranched polymer 3 was set into a rack of a reaction system, wherein the reaction system included a condenser tube, a drying device, an oil bath, a heating device, an over-temperature protection device and a temperature probe. Also, the heating device was set at the synthesis temperature (i.e. 130° C.). Synthesis reaction was carried out at a controlled temperature, and the solution in the three-necked flask was continuously stirred during the synthesis reaction. Samples were taken from time to time during the reaction, and gel permeation chromatography (GPC) was used for GPC analysis as the basis for the initial determination of the degree of reaction. FIG. 9 is a graph of gel permeation chromatography (GPC) data of nitrogen-containing hyperbranched polymer solution 3, in accordance with some embodiments of the present disclosure. In FIG. 9, GPC data is presented as a graph of detector response (or sensitivity) (y-axis) against retention time (x-axis). Operation conditions of gel permeation chromatography (GPC) analysis performed in the embodiments have been described above, and not repeated herein.

During the reaction, the nitrogen-containing hyperbranched polymer gradually took shape. After the reaction continued for 24 hours at 130° C., the heating device was removed. When the solution temperature was dropped to room temperature, the solution was filtered to obtain 3 wt % of polymer solution containing nitrogen-containing hyperbranched polymer 3.

<Preparation of Core-Shell Structure>

Methods for preparing the core-shell structures in accordance with some embodiments of the present disclosure were disclosed below. In one example of core-shell structure, the multi-functional film on the surface of the core particle 12 had two material layers that include the organic polymer layer 13 and the organic-inorganic composite layer 14, as shown in FIG. 2. In the other example of core-shell structure, the multi-functional film on the surface of the core particle 12 had one material layer, that was, the organic-inorganic composite layer 14, as shown in FIG. 1.

[First example of core-shell structure: the multi-functional film including above-mentioned composite 2, that includes the nitrogen-containing hyperbranched polymer linked with copolymer having a thiophene structure with a lithium sulfonate]

In the first example of core-shell structure, modification was performed on the surface of the core particle with a nitrogen-containing hyperbranched polymer to form an organic polymer layer 13, as described in step A below.

Next, the above-mentioned solution of composite 2 having nitrogen-containing hyperbranched polymer linked with copolymer having a thiophene structure with a lithium sulfonate was coated on the surface of the cathode material modified with nitrogen-containing hyperbranched polymer by mixing and agitating, or any other suitable methods, as described in step B below. That was, an organic-inorganic composite layer 14 was formed on the organic polymer layer 13. In step B, spray granulation could be used to form and collect core-shell structural particles each having two material layers (i.e. the organic polymer layer 13 and the organic-inorganic composite layer 14).

In addition, one or more conductive additives could be added to the organic-inorganic composite layer 14 to further improve the conductivity of the organic-inorganic composite layer 14. As described in step C below, the organic-inorganic composite layer 14 containing conductive additive(s) was coated on the surface of the cathode material modified with nitrogen-containing hyperbranched polymer. After coating, spray granulation could be used to form and collect the core-shell structural particles each having two material layers (i.e. the organic polymer layer 13 and the organic-inorganic composite layer 14 containing conductive additive(s)).

Details of step A to step C are described below.

A. Preparation of Cathode Material Surface Modified with Nitrogen-Containing Hyperbranched Polymer (1) 0.3 g of bisphenol A diphenyether bismaleimide (CAS no.:79922-55-7) was added into a conical flask, followed by adding 45 g of acetone (solvent) and stirred to form a completely dissolved solution.

(2) ⅓ of the above-mentioned completely dissolved solution was added to a round bottom flask containing 300 g of cathode material (NMC811 particles) and stirring vigorously to make the particles evenly dispersed in the solution. At this time, bisphenol A diphenyether bismaleimide was polymerized in the presence of the strong basicity (pH>11) of NMC811 cathode material, thereby coating a nitrogen-containing hyperbranched polymer on the surfaces of the NMC811 particles (cathode material).

(3) Then, the round bottom flask was connected to a vacuum extraction device to remove the solvent. During the removal of the solvent, the solution in the round bottom flask was continuously stirring, so that the nitrogen-containing hyperbranched polymer could be evenly distributed on the surfaces of the cathode material (NMC811 particles).

(4) Next, the solvent was removed until there was no solvent in the round bottom flask (viewed by naked eyes). Then, ⅓ of the above-mentioned solution was further added to the round bottom flask, and the steps (2) and (3) were repeated until all solution was used up.

(5) The solvent was continuously removed until the agglomerated cathode material clumps were dispersed as powder-like particles. Then, the obtained 0.1 wt % of the cathode material particles having surfaces modified with nitrogen-containing hyperbranched polymer were placed in a vacuum oven for drying. The cathode material particles could be dried for 4 hours to 24 hours at a temperature between 50° C. to 120° C. Afterwards, the dried cathode material particles were removed from the vacuum oven, and ready to use after cooling.

B. Preparation of Surface-Modified Cathode Material Coated with a Layer Containing Nitrogen-Containing Hyperbranched Polymer Linked with a Copolymer Having a Thiophene Structure with a Lithium Sulfonate (1) 25 g of the above-mentioned solution of composite 2 having nitrogen-containing hyperbranched polymer linked with a copolymer having a thiophene structure with a lithium sulfonate (3 wt %) was added to a round bottom flask, followed by adding 125 g of ethanol as a solvent to form a solution. The solution was stirring to fully mixed. Then, 150 g of the above-mentioned cathode material (i.e. NMC811 particles) having surfaces modified with nitrogen-containing hyperbranched polymer obtained in step A was added to the round bottom flask in batches. The solution as formed was continuously stirring to fully mix and disperse the compositions in the round bottom flask when the surfaces-modified cathode material was added. After adding all the surfaces-modified cathode material, the solid content of the solution was about 50%.

(2) A spray drying system (BUCHI B-290 Spray Dryer) was used for the preparation of the surface-modified cathode material coated with a layer containing nitrogen-containing hyperbranched polymer linked with a copolymer having a thiophene structure with a lithium sulfonate. After spray drying, about 0.5 wt % particles of the surface-modified cathode material that included nitrogen-containing hyperbranched polymer linked with a copolymer having a thiophene structure with a lithium sulfonate on the surface of modified cathode material were collected. The operating conditions of the spray drying system used herein are provided below, including that (1) the diameter of the atomizing nozzle was 0.7 mm; (2) the inlet temperature and the outlet temperature were 110° C. and 80° C., respectively; (3) the speed of the peristaltic pump was 600 rpm/60 Hz; and (4) pumping speed of the pump was 100%.

C. Preparation of surface-modified cathode material coated with a layer containing conductive additive and nitrogen-containing hyperbranched polymer linked with the copolymer having a thiophene structure with a lithium sulfonate.

(1) 50 g of the above-mentioned solution of composite 2 having nitrogen-containing hyperbranched polymer linked with the copolymer having a thiophene structure with a lithium sulfonate (3 wt %) and 70 g of a carbon nanotube solution (containing 0.2 wt % of carbon nanotubes, 0.2% of adhesives and a small amount of dispersant in NMP solvent) were added to a round bottom flask, followed by adding 250 g of ethanol as a solvent to form a solution. The solution was stirring to fully mixed. Then, 150 g of the above-mentioned cathode material (i.e. NMC811 particles) having surfaces modified with nitrogen-containing hyperbranched polymer obtained in step A was added to the round bottom flask in batches. The solution as formed was continuously stirring to fully mix and disperse the compositions in the round bottom flask when the surfaces-modified cathode material was added. After all the surfaces-modified cathode material was added, the solid content of the solution was about 41%.

(2) A spray drying system (BUCHI B-290 Spray Dryer) was used for the preparation of the surface-modified cathode material coated with a layer containing conductive additive and nitrogen-containing hyperbranched polymer linked with the copolymer having a thiophene structure with a lithium sulfonate. After spray drying, about 1 wt % particles of the surface-modified cathode material that includes conductive additive and nitrogen-containing hyperbranched polymer linked with a copolymer having a thiophene structure with a lithium sulfonate on the surface of modified cathode material were collected. The operating conditions of the spray drying system used herein had been described aove, and were not repeated herein.

[Second Example of Core-Shell Structure: The Multi-Functional Film Including Above-Mentioned Polymer Solution 1 Containing Nitrogen-Containing Hyperbranched Polymer Linked with Modified Prussian Blue]

In the second example of core-shell structure, modification was performed by coating a material layer that included a nitrogen-containing hyperbranched polymer linked with modified Prussian blue on the surface of the core particle. Preparation steps are described below.

A. Preparation of Surface-Modified Cathode Material Coated with a Layer Containing Nitrogen-Containing Hyperbranched Polymer Linked with Modified Prussian Blue (1) 48 g of the above-mentioned polymer solution 1 containing nitrogen-containing hyperbranched polymer linked with modified Prussian blue (5 wt %) was added to a conical flask, followed by adding 250 g of ethanol as a solvent to form a solution. The solution as formed was continuously stirring to fully mix the compositions in the conical flask.

(2) ⅓ of the above-mentioned solution was added to a round bottom flask containing 300 g of the above-mentioned cathode material (i.e. NMC811 particles), and the solution was stirring vigorously to make the particles evenly dispersed in the solution. During stirring, the surface of the cathode material was coated with a layer of nitrogen-containing hyperbranched polymer linked with modified Prussian blue.

(3) Then, the round bottom flask was connected to a vacuum extraction device to remove the solvent. During the removal of the solvent, the solution in the round bottom flask was continuously stirring, so that the nitrogen-containing hyperbranched polymer linked with modified Prussian blue could be evenly distributed on the surfaces of the cathode material.

(4) Next, the solvent was removed until there was no solvent in the round bottom flask (viewed by naked eyes). Then, ⅓ of the above-mentioned solution was further added to the round bottom flask, and the steps (2) and (3) were repeated until all solution was used up.

(5) The solvent was continuously removed until the agglomerated cathode material clumps were dispersed as powder-like particles. Then, the obtained cathode material particles having surfaces modified with nitrogen-containing hyperbranched polymer linked with modified Prussian blue were placed in a vacuum oven for drying. The cathode material particles could be dried for 4 hours to 24 hours at a temperature between 50° C. to 120° C. Afterwards, the dried cathode material particles were removed from the vacuum oven, and ready to use after cooling.

B. Preparation of Surface-Modified Cathode Material Coated with a Layer Containing Conductive Additive and Nitrogen-Containing Hyperbranched Polymer Linked with Modified Prussian Blue (1) 50 g of the above-mentioned solution of polymer solution 2 containing nitrogen-containing hyperbranched polymer linked with modified Prussian blue and 0.5 g of carbon nanocapsules were added to a round bottom flask, followed by adding 250 g of ethanol as a solvent to form a solution. The solution as formed was continuously stirring to fully mix. Then, 250 g of the above-mentioned cathode material (i.e. NMC811 particles) was added to the solution in batches, and the solution was continuously stirring to fully mix when the surfaces-modified cathode material was added. After adding all the surfaces-modified cathode material, the solid content of the solution was about 50%.

(2) A spray drying system (BUCHI B-290 Spray Dryer) was used for the preparation of the surface-modified cathode material coated with a layer containing conductive additive and nitrogen-containing hyperbranched polymer linked with modified Prussian blue. After spray drying, particles that includes conductive additive and nitrogen-containing hyperbranched polymer linked with modified Prussian blue on the surface of modified cathode material were collected. The operating conditions of the spray drying system used herein have been described above, and are not repeated herein.

Below, exemplary embodiments and comparative examples would be provided for describing the preparation of cathode and fabrication of batteries applied with the cathode.

<Preparation of Cathode>

Preparation of a surface-modified cathode that contains a conductive additive and a nitrogen-containing hyperbranched polymer linked with an ion-conducting material was provided below. In some embodiments, powders of the cathode material coated with a layer containing a conductive additive and a nitrogen-containing hyperbranched polymer linked with an ion-conducting material could be mixed with other components such as conductive additives and one or more adhesive agents, thereby forming a slurry mixture for preparing an electrode plate. The obtained slurry mixture could be coated on a metal foil (such as an aluminum foil), followed by drying and rolling, so as to form a surface-modified electrode plate.

In some embodiments, the core particle of the surface-modified cathode material, coated with conductive additive and nitrogen-containing hyperbranched polymer linked with ion-conducting material in accordance with the present disclosure, might include lithium mixed metal oxide, such as $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ (0<x<1), $LiMPO_4$ (M=transition metal), $LiMn_{0.5}Ni_{0.5}O_2$, $LiNi_xCo_yMn_zO_2$ (x+y+z=1), $LiNi_xCo_yAl_zO_2$ (x+y+z=1), $Mc_{0.5}Mn_{1.5}O_4$, or a combination thereof. "Mc" in $LiMc_{0.5}Mn_{1.5}O_4$ is a divalent metal. In some embodiments, the cores have an average particle size in a range of about 1 μm to about 30 μm.

The obtained surface-modified powders of cathode material, a conductive additive, and a binder were dispersed in a solution to obtain a slurry composition of cathode. The weight ratio of the surface-modified powders of cathode material, the conductive additive and the binder might be about 85-99:0.1-6:0.1-6, preferably about 92-96:1-4:1-4. In some embodiments, the conductive additive included carbon black, graphite, carbon nanotubes, graphene, acetylene black, nickel powders, aluminum powders, titanium powders, stainless steel powders, or a combination of thereof. The binder improves mechanical properties of the cathode. In some embodiments, the binder includes polyvinylidene fluoride (PVDF), styrene-butadiene rubber (SBR), polyamide, melamine resin, or a combination thereof. A solvent system used in the embodiments might be a single solvent or a cosolvent system. In some embodiments, the solvent includes (but does not limited to) γ-Butyrolactone, propylene carbonate, N-methyl pyrollidone, or a combination thereof. In addition, the slurry composition of cathode may further include other additive, such as a surfactant, reaction initiator, or a combination thereof.

Figure 10:
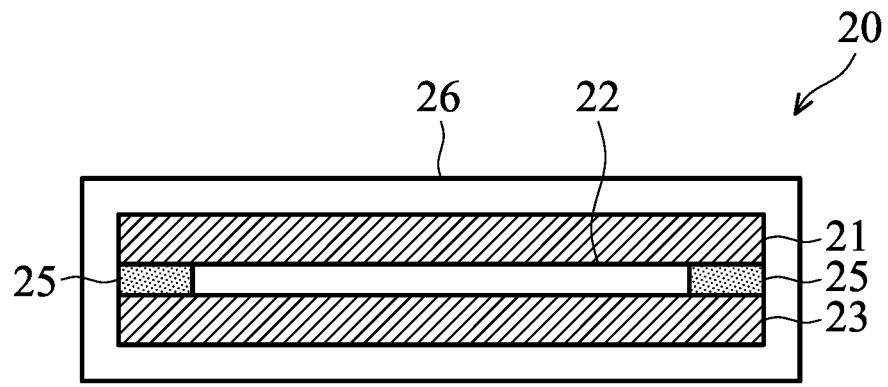
FIG. 10 is a cross-sectional view of a lithium battery 20, in accordance with some embodiments of the present disclosure.

FIG. 10 is a cross-sectional view of a lithium battery 20, in accordance with some embodiments of the present disclosure. The lithium battery 20 includes a cathode (positive electrode) 21 and an anode (negative electrode) 23. The cathode (positive electrode) 21 is the surface-modified cathode prepared with the aforementioned method of the embodiments. The lithium battery 20 further includes a separator 25 between the cathode 21 and the anode 23 to define a region for receiving an electrolyte solution. In addition, a packing structure 26 is formed to encapsulate the cathode 21, the anode 23, the separator 25 and the electrolyte solution.

Figure 11:
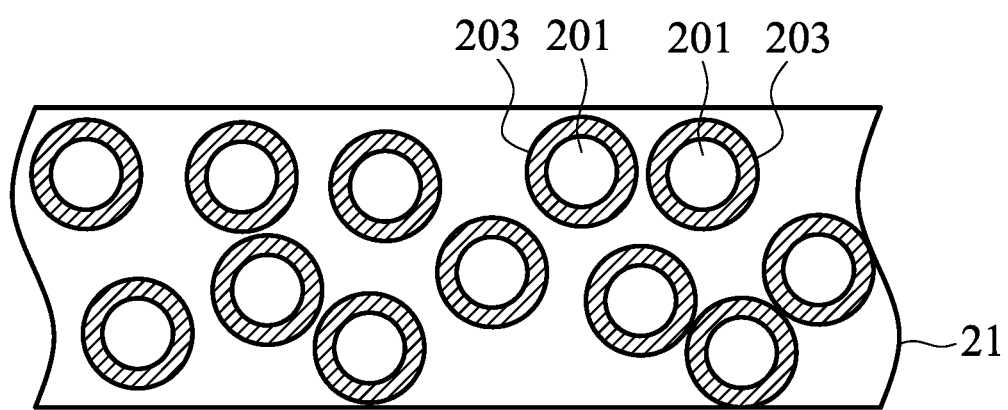
FIG. 11 is a partially enlarged view of a modified cathode, in accordance with some embodiments of the present disclosure.

FIG. 11 is a partially enlarged view of a modified cathode 21, in accordance with some embodiments of the present disclosure. In this modified cathode 21, the surface of the core particle 201 is coated with a layer 203 containing the conductive additive and the nitrogen-containing hyperbranched polymer linked with the ion-conducting material in accordance with some embodiments of the present disclosure. For example, the layer 203 containing the conductive additive and the nitrogen-containing hyperbranched polymer linked with the ion-conducting material fully covers and encapsulates the surface of the core particle 201.

It should be understood by those skilled in the art that a cathode material can be modified according to the above-mentioned modification steps in the embodiments, followed by preparing a slurry composition containing the modified cathode material. Then, the obtained slurry composition can be coated on a metal foil (such as an aluminum foil), followed by drying and rolling to form a surface-modified cathode.

In some embodiments, the surface-modified cathode that includes the conductive additive and the nitrogen-containing hyperbranched polymer linked with the ion-conducting material may further include carbide and lithium alloy. The carbide may include carbon powers, graphite, carbon fibers, carbon nanotubes, graphene, or a combination thereof. In one embodiment, the carbide is carbon powers, and the particle sizes of the carbon powers are between about 1 μm to about 30 μm. A metal-based surface-modified cathode may include Al, Zn, Bi, Cd, Sb, Si, Pb, Sn, $Li_3FeN_2$, $Li_{2.6}Co_{0.4}N$, $Li_{2.6}Cu_{0.4}N$, or a combination thereof. Besides the carbide and lithium alloy as mentioned above, the surface-modified cathode may further include one or more metal oxides, such as $SnO$, $SnO_2$, $GeO$, $GeO_2$, $In_2O$, $In_2O_3$, $PbO$, $PbO_2$, $Pb_2O_3$, $Pb_3O_4$, $Ag_2O$, $AgO$, $Ag_2O_3$, $Sb_2O_3$, $Sb_2O_4$, $Sb_2O_5$, $SiO$, $ZnO$, $CoO$, $NiO$, $FeO$, $TiO_2$, $Li_3Ti_5O_{12}$, or a combination thereof. In some embodiments, the surface-modified cathode may further include the binder, such as polyvinylidene fluoride (PVDF), styrene-butadiene rubber (SBR), polyamide, melamine resin, or a combination thereof.

The separator 25 is formed by an insulating material, such as polyethylene (PE) or polypropylene (PP), or formed as a multi-layered structure including the above-mentioned insulating materials. In one example, the separator 25 is a three-layer structure including a polyethylene layer sandwiched between two polypropylene layers (also represented as "PE/PP/PE").

In some embodiments, the main components of the above-mentioned electrolyte solution are an organic solvent, lithium slats and additives. The organic solvent may include y-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof. The lithium slats may include $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, $LiB(C_2O_4)_2$, or a combination thereof.

Cathode in Example 1

20 g of the binder (i.e. poly(vinylidenefluoride), PVDF in this example) was added to 180 g of NMP solvent to form a binder solution. The binder solution was continuously stirred until the binder was fully dissolved in the NMP solvent. Then, 1000 g of surface-modified Li(Ni—Mn—Co)$O_2$ ternary material powders (i.e. 0.1 wt % of NMC 811 particles having surfaces modified with the nitrogen-containing hyperbranched polymer of the embodiments used in this example) and 20 g of the conductive additive (i.e. Super P in this example) were mixed and added to the binder solution batch by batch at 25° C. During this period, 120 g of NMP solvent was added in 2 or 3 batches, and the solution was stirring vigorously for 2 hours. After the solution was defoamed and filtered, the slurry mixture (having a solid content of about 72%) was coated on an aluminum foil, followed by drying at 130° C., rolling and cutting to form a surface-modified cathode. In Example 1, the weight percentages of the surface-modified Li(Ni—Mn—Co)$O_2$ ternary material powders, the conductive additive and the binder are 96%, 2% and 2%, respectively.

Cathode in Example 2

20 g of the binder (i.e. poly(vinylidenefluoride), PVDF in this example) was added to 180 g of NMP solvent to form a binder solution. The binder solution was continuously stirred to fully dissolve the binder in the NMP solvent. Then, 1000 g of surface-modified Li(Ni—Mn—C)$O_2$ ternary material powders (i.e. 0.3 wt % of NMC 811 particles having surfaces modified with conductive additive and nitrogen-containing hyperbranched polymer linked with ion-conducting material of the embodiments used in this example) and 20 g of the the conductive additive (i.e. a combination of carbon nanocapsules and carbon nanotube fibers used in this example, wherein the weight ratios of the carbon nanocapsules and carbon nanotube fibers are 19:1 w/w in this example) were mixed and added to the binder solution batch by batch at 25° C. During this period, 120 g of NMP solvent was added in 2 or 3 batches, and the solution was stirring vigorously for 2 hours. After the solution was defoamed and filtered, the slurry mixture (having a solid content of about 72%) was coated on an aluminum foil, followed by drying at 130° C., rolling and cutting to form a surface-modified cathode. In Example 2, the weight percentages of the surface-modified Li(Ni—Mn—Co)$O_2$ ternary material powders, the conductive additive and the binder were 96.2%, 1.9% and 1.9%, respectively.

Cathode in Comparative Example 1

20 g of the binder (i.e. poly(vinylidenefluoride), PVDF in this example) was added to 180 g of NMP solvent to form a binder solution. The binder solution was continuously stirred to fully dissolve the binder in the NMP solvent. Then, 1000 g of Li(Ni—Mn—Co)O$_2$ ternary material powders (i.e. 0.1 wt % of NMC811 particles in this comparative example) without surface modification and 20 g of the conductive additive (i.e. Super P) were mixed and added to the binder solution batch by batch at 25° C. During this period, 120 g of NMP solvent was added in 2 or 3 batches, and the solution was stirring vigorously for 2 hours. During this period, 120 g of NMP solvent was added in 2 or 3 batches, and the solution was stirring vigorously for 2 hours. After the solution was defoamed and filtered, the slurry mixture (having a solid content of about 72%) was coated on an aluminum foil, followed by drying at 130° C., rolling and cutting to form a cathode. In Comparative Example 1, the weight percentages of the surface-modified Li(Ni—Mn—Co)O$_2$ ternary material powders, the conductive additive and the binder were 96%, 2% and 2%, respectively.

<Fabrication of Battery>
Half-Cell in Battery Test

CR2032 coin cell battery was used as the half-cell in the battery test. Cathode in the battery test included the above-mentioned cathode (without surface modification) in Comparative Example 1, the above-mentioned cathode (NMC 811 particles having surfaces modified with the nitrogen-containing hyperbranched polymer) in Example 1, and the above-mentioned cathode in Example 2 (NMC 811 particles having surfaces modified with conductive additive and the nitrogen-containing hyperbranched polymer linked with ion-conducting material). Each of the half-cells in the battery test included an anode containing lithium metal. Each of the half-cells in the battery test included a separator with a three-layer structure of PE/PP/PE. The electrolyte solution included 1.1 M of LiPF$_6$ dissolved in a mixed solvent of propylene carbonate (PC), ethylene carbonate (EC) and diethyl carbonate (DEC) (weight ratio EC/PC/DEC=3/2/5).

Full Cell in Battery Test

In the full-cell battery test, the anodes were formed of SiOx/C (i.e. based on amorphous carbon and a SiOx matrix) anode material. 42.2 g of water-based binder (NIPPON A&L 48% SBR SN-307R in this example), 1170 g of the other water-based binder (1.5% of carboxymethyl cellulose CMC2200 in this example) and 337.5 g of 0.4% carbon nanotube solution were mixed and continuously stirred to fully disperse the materials. Then, 1306.8 g of SiOx/C-based anode powder material (SiOx/C BTR 550 in this example) and 4.1 g of the conductive additive (Super P in this example) were mixed and added to the binder solution batch by batch at 25° C., wherein the resulting solution was fully stirred at 25° C. During this period, 140 g of deionized water was added in 2 or 3 batches, and the solution was stirring vigorously for 2 hours. After the solution was defoamed and filtered, the slurry mixture (having a solid content of about 45%) was coated on an aluminum foil, followed by drying at 130° C., rolling and cutting to form a SiOx/C-based anode. In the SiOx/C-based anode, the weight percentages of the SiOx/C, the conductive additive (Super P) and the binders (SBR SN-307R and CMC2200) were 96.8%, 0.4% and 2.8%, respectively.

The above-mentioned cathode (without surface modification) in Comparative Example 1, the above-mentioned cathode (NMC 811 particles having surfaces modified with the nitrogen-containing hyperbranched polymer) in Example 1, and the above-mentioned cathode in Example 2 (NMC 811 particles having surfaces modified with conductive additive and the nitrogen-containing hyperbranched polymer linked with ion-conducting material) were respectively assembled with the above-mentioned SiOx/C-based anode and the separator with a three-layer structure of PE/PP/PE to form a battery core (jelly roll). The battery core was packed with an aluminum plastic film for forming a 503759 battery. 503759 battery size: 0.5 cm (thick)×3.7 cm (width)×5.9 cm (length). During the packing period, three sides of the package were sealed (sealing conditions: 4.0 kgf/cm$^2$, 180° C./3 s) and one side of the package stays open. Then, the standard lithium battery electrolyte [1.01M LiPF$_6$/EC+PC+DEC (volume ratios of EC: PC: DEC=3: 2: 5)] was added from an opening of the unsealed side of the package, and the final sealing (final sealing conditions: 4.0 kgf/cm$^2$, 180° C./3s) was performed after evacuation. The amount of the electrolyte added to each of the lithium batteries was 4.2 g/cell. Finally, the lithium batteries were activated by a standardized procedure to obtain the final lithium batteries of the embodiments and comparative example.

<Characteristic Analysis>

Electrode powders prepared with the methods of some embodiments (i.e. having core-shell structure as disclosed in the aforementioned descriptions) were used for forming cathode and batteries having the cathode, and several characteristic analyses were performed herein. For example, the cathode prepared in Example 1, Example 2 and Comparative Example 1 were taken for forming half-cells, and related tests such as AC impedance test, discharge capacity and heat released in exothermic reaction were performed, respectively.

(1) AC Impedance Analysis

Electrode powders prepared with the methods of some embodiments (i.e. having core-shell structure as disclosed in the aforementioned descriptions) were used for forming cathode of half-cells. In a half-cell, a rechargeable system composed of lithium battery electrode powders as a cathode material and pure lithium metal as an anode material. Initial impedance measurements (at frequencies of 1 kHz) were performed on the half-cells. Also, a half-cell including a cathode that was formed by electrode powders without surface modification was constructed, and an initial impedance measurement was performed for comparison.

Impedance results are listed in Table 1. As shown in Table 1, since the thickness of the material layer covering the surface of the core particle for modifying the surface of cathode material merely has few nanometers, it does not increase the impedances of the half-cell and the full cell. Impedances of the half-cell and full cell containing the surface-modified cathode (i.e. obtained in Examples 1 and 2) are even lower than the impedance of the half-cell and full cell containing the cathode without surface modification (i.e. obtained in Comparative Example 1).

TABLE 1

(Results of impedance analysis in Example 1, Example 2, and Comparative Example 1 (half-cells))

|  | Comparative Example 1 | Example 1 | Example 2 |
|---|---|---|---|
| Material layer on the surface of the core particle for forming surface-modified cathode material | none | modified nitrogen-containing hyperbranched polymer | conductive additive and nitrogen-containing hyperbranched polymer linked with ion-conducting material |
| Electrode impedance, mΩ | 13.5 | 6.6 | 5.2 |
| Half-cell impedance, mΩ | 7.0 | 5.6 | 4.7 |
| Full-cell impedance (at 0.5 C.), Ω | 51.4 | 50.3 | 49.8 |

[Note]:
Four probes were used to contact the surfaces of the cathodes of Comparative Example 1 and Examples 1-2, and the current was applied to measure the change in voltage of each of the cathodes. The four probes were arranged on the same straight line, and direct current was applied to the two outer probes to induce a voltage between the two inner probes to obtain the sheet resistance value of the cathode.

In addition, a cathode formed of the electrode powders prepared with the methods of some embodiments (i.e. having core-shell structure as disclosed in the aforementioned descriptions) (i.e. obtained in Example 1) and an amorphous carbon anode were assembled into a 18650 battery (i.e. a lithium-ion cell). Initial impedance measurement and impedance measurement after 600 cycles of testing on the 18650 battery were performed. Also, a half-cell including a cathode that was formed by electrode powders without surface modification (i.e. obtained in Comparative Example 1) was constructed, and an initial impedance measurement and impedance measurement after 600 cycles of testing were performed for comparison. The measurement results of AC impedances of the 18650 battery and the half-cell obtained in Comparative Example 1 are shown in FIG. 12.

Figure 12:
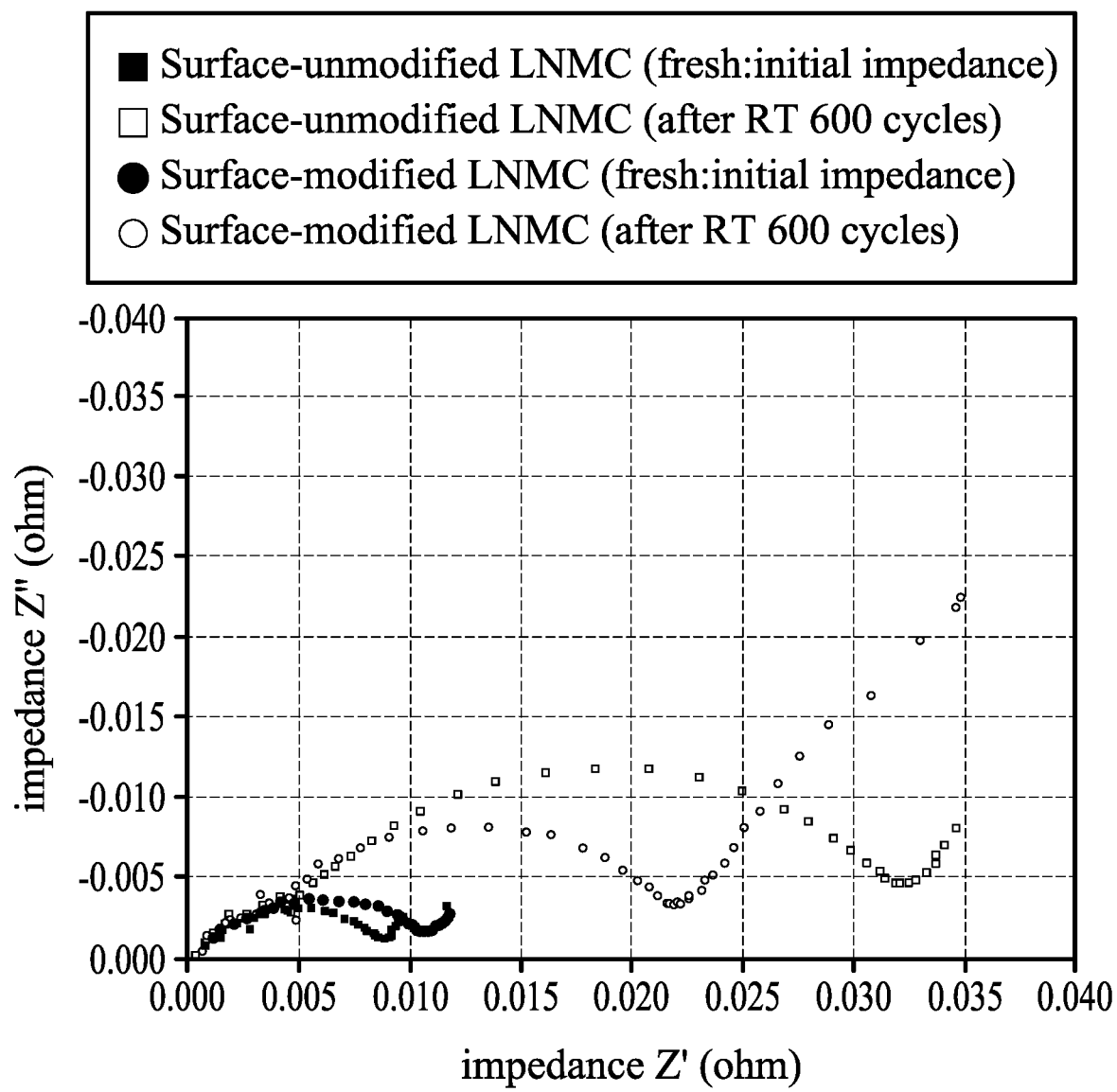
FIG. 12 shows measurement results of AC impedances of the lithium battery and the half-cell, in accordance with some embodiments of the present disclosure.

FIG. 12 shows measurement results of AC impedances of the 18650 battery and the half-cell, in accordance with some embodiments of the present disclosure. As shown in FIG. 12, since the thickness of the material layer covering the surface of the core particle for modifying the surface of cathode material is merely few nanometers, it does not increase the initial impedance of the 18650 battery. The initial impedances of the 18650 battery and the half-cell including a cathode obtained in Comparative Example 1 are almost the same. However, after the 18650 battery and the half-cell were cycled 600 times at room temperature, the impedance increase of the half-cell including a cathode (using unmodified NMC particles) obtained in Comparative Example 1 was more than 260%, while the impedance increase of the battery using the surface-modified electrode powders was only about 105%. In addition, after 100 times of charge and discharge at a high temperature (55° C.), the impedance of the battery using the surface-modified electrode powders was almost the same as the original impedance, but the impedance of the battery using unmodified electrode powders would increase to 3 times greater than the original impedance. It has indicated that the material layer on the surface of the core particle for modifying the surface of cathode material, in accordance with some embodiments, does have protection effect of the cathode material, and effectively inhibit the reaction of the active materials of the cathode with the electrolyte solution, and reduce the generation of the passivation layer.

(2) Analysis of Discharge Capacity and Ratio of Irreversible Capacity

The lithium batteries of Example 1, Example 2, and Comparative Example 1 were respectively charged and discharged in the first cycle by a constant current/voltage at room temperature (30° C.) using a potentiostat (manufactured by Biologic Corporation, model number VMP3). First, the battery was charged to 4.3V with a constant current of 0.1 C until the current was less than or equal to 0.025 C. Then, the battery was discharge to a cut-off voltage of 3.0V at a constant current of 0.1 C. The charge capacities, discharge capacities and irreversible ratios of the lithium batteries of Example 1, Example 2, and Comparative Example 1 were shown in Table 2.

TABLE 2

(Charge capacities, discharge capacities and irreversible ratios of the lithium batteries of Example 1, Example 2 and Comparative Example 1)

|  | Comparative Example 1 | Example 1 | Example 2 |
|---|---|---|---|
| Material layer on the surface of the core particle for forming surface-modified cathode material | none | modified nitrogen-containing hyperbranched polymer | conductive additive and nitrogen-containing hyperbranched polymer linked with ion-conducting material |
| First cycle charge capacity, mAh/g | 185.8 | 206.7 | 196.5 |
| First cycle discharge capacity, mAh/g | 164.8 | 184.1 | 175.2 |
| First cycle irreversible ratios, % | 11% | 11% | 11% |

TABLE 2-continued (Charge capacities, discharge capacities and irreversible ratios of the
lithium batteries of Example 1, Example 2 and Comparative Example 1)

|  | Comparative Example 1 | Example 1 | Example 2 |
|---|---|---|---|
| Capacity after discharging with FM 0.1 C., mAh/g | 183.2 | 187.3 | 185.6 |

The results in Table 2 had indicated that the discharge and discharge capacities of the batteries containing surface-modified cathode material were greater than the discharge and discharge capacities of the battery containing unmodified cathode material. Thus, the core particles covered by nitrogen-containing hyperbranched polymer (Example 1) or covered by conductive additive and the nitrogen-containing hyperbranched polymer linked with ion-conducting material (Example 2) for forming the surface-modified cathode material do increase the electrical stability of the surface-modified cathode material during the charge-discharge period. The same irreversible ratios (11%) of the lithium batteries of Example 1, Example 2, and Comparative Example 1 were obtained.

(3) Analysis of Heat Released in Exothermic Reaction

The batteries of Example 1, Example 2, and Comparative Example 1 were charged to 4.3V with a constant current of 0.1 C. Then, the batteries were disassembled in a glove box, and the cathodes were removed from the glove box. After active material of the cathode was scrapped off, 10 g of the active material was placed on the sample tray and loaded into a Differential Scanning calorimetry (DSC). The DSC measurement was taken at a scanning temperature in the ranges from 75° C. to 375° C. at a heating rate of 10° C./minute. Exothermic behavior of the cathode materials were observed during the heating period. The amount of heat released in an exothermic reaction by the cathode materials in the batteries of Example 1, Example 2, and Comparative Example 1 are shown in Table 3.

improve the thermal stability of the surface-modified cathode material during the charge-discharge period. Also, compared with the unmodified cathode material of Comparative Example 1, the amount of heat released in exothermic reaction by the surface-modified cathode materials of Examples 1 and 2 were decreased by 17% and 26%, respectively.

According to the aforementioned descriptions, a core-shell structure as provided includes a highly-stable and multi-functional film on a core particle (such as containing high-nickel cathode material). According to the embodiments, the multi-functional film does improve the structural stability and the chemical resistance of the core particles of cathode material, and also inhibits the reaction between the core particle (e.g. the surface of the high-nickel cathode material having $Ni^{4+}$) and the electrolyte, so as to protect the outer surface of the core particle. In addition, the multi-functional film does effectively reduce the surface phase change as well as the expansion and contraction rate of the cathode material. Therefore, when the core-shell structure of the embodiments is applied to a battery, the life cycles and the safety of the battery at high temperature can be greatly improved. Furthermore, in the embodiments of the core-shell structure, an ion-conducting material of an organic-inorganic composite layer has at least ion-conducting properties, thereby enhancing the conductivity of lithium ions of the core particle. Also, in some embodiments, the ion-conducting material at least has an ion-conducting segment/group and an electron-conducting segment/group, so that the

TABLE 3

(Amount of heat released in exothermic reaction by the cathode
materials in the batteries of Example 1, Example 2, and Comparative Example 1)

|  | Comparative Example 1 | Example 1 | Example 2 |
|---|---|---|---|
| Material layer on the surface of the core particle for forming surface-modified cathode material | none | modified nitrogen-containing hyperbranched polymer | conductive additive and nitrogen-containing hyperbranched polymer linked with ion-conducting material |
| Amount of exothermic heat, J/g | 924.4 | 765.9 | 685.4 |
| Decrease ratio of heat released in exothermic reaction (compared with Comparative Example 1) | — | 17% | 26% |

The results in Table 3 have indicated that the amount of heat released in exothermic reaction by the surface-modified cathode material are lower than the amount of heat released in exothermic reaction by the unmodified cathode material. Thus, the core particles covered by nitrogen-containing hyperbranched polymer (Example 1) or covered by conductive additive and the nitrogen-containing hyperbranched polymer linked with ion-conducting material (Example 2) for forming the surface-modified cathode material do organic-inorganic composite layer on the surface of the core particle has good electron-conducting properties and good ion-conducting properties simultaneously. By applying the organic-inorganic composite layer 14 having good ion-conducting and electron-conducting properties, the effect of the organic-inorganic composite layer 14 on the specific capacity and the effect of energy density on the cathode material can be reduced, thereby improving the charge and discharge performance of the battery in the application. In addition, the amount of heat released in an exothermic reaction by the surface-modified cathode material (containing the core-shell structure of the embodiments) is lower than the amount of heat released in exothermic reaction by the unmodified cathode material. Thus, the surface-modified cathode material of the embodiments has improved the thermal stability in the charge and discharge period. In some other embodiments, the core-shell structure may further include a solid-state electrolyte material, and can be used in a solid-state electrode. The core-shell structure of the embodiments can meet the requirements of high energy, long operating life, high operational safety and stability. Also, the core-shell structure of the embodiments can solve the problems of incomplete modification, uneven coating, unstable quality and performance caused by wet mixing process.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A core-shell structure, comprising:
a core particle, comprising lithium cobalt oxide, lithium nickel cobalt oxide, lithium nickel cobalt manganese oxide, or lithium nickel cobalt aluminum oxide; and
an organic-inorganic composite layer formed on a surface of the core particle for encapsulating the core particle, the organic-inorganic composite layer comprising a nitrogen-containing hyperbranched polymer and an ion-conducting material, wherein the ion-conducting material is a lithium-containing linear polymer or a modified Prussian blue, the lithium-containing linear polymer has an ion-conducting segment, and the modified Prussian blue has an ion-conducting group.

2. The core-shell structure as claimed in claim 1, wherein the ion-conducting material is dispersed and embedded in the nitrogen-containing hyperbranched polymer.

3. The core-shell structure as claimed in claim 1, wherein the nitrogen-containing hyperbranched polymer is a hyperbranched polymer formed by copolymerization of barbituric acid and one or more imide-based compounds.

4. The core-shell structure as claimed in claim 1, wherein the lithium-containing linear polymer further has an electron-conducting segment.

5. The core-shell structure as claimed in claim 1, wherein the lithium-containing linear polymer is a copolymer having a thiophene structure.

6. The core-shell structure as claimed in claim 1, wherein the ion-conducting segment comprises a lithium sulfonate group.

7. The core-shell structure as claimed in claim 1, wherein the modified Prussian blue is represented by a molecular formula of $K_4Fe(CN)_6$.

8. The core-shell structure as claimed in claim 1, wherein the organic-inorganic composite layer further comprises a conductive material, and the conductive material comprises a conductive polymer, a first conductive additive, or a combination thereof.

9. The core-shell structure as claimed in claim 8, wherein the first conductive additive comprises a conductive carbon material, and the conductive carbon material comprises conductive carbon black, conductive graphite flakes, carbon nanotubes (CNT), graphene, or a combination thereof.

10. The core-shell structure as claimed in claim 1, further comprising:
an organic polymer layer covering a surface of the core particle, and the organic polymer layer comprising a nitrogen-containing and benzene ring-containing polymer,
wherein the organic-inorganic composite layer is directly formed on the organic polymer layer.

11. The core-shell structure as claimed in claim 10, wherein the nitrogen-containing and benzene ring-containing polymer comprises bismaleimide polymer, polyimide, or an imide-based interpenetrating polymer network (IPN) material.

12. The core-shell structure as claimed in claim 1, further comprising:
an adhesive layer formed on the organic-inorganic composite layer, wherein the adhesive layer comprises an adhesive and a second conductive additive.

13. The core-shell structure as claimed in claim 12, wherein the adhesive comprises polyvinylidene fluoride, polyvinylpyrrolidone (PVP), or a combination thereof.

14. The core-shell structure as claimed in claim 12, wherein the adhesive further comprises a solid-state electrolyte.

15. The core-shell structure as claimed in claim 14, wherein the solid-state electrolyte comprises lithium aluminum titanium phosphate (LATP), tantalum-doped lithium lanthanum zirconate (LLZTO), lithium aluminum germanium phosphate (LAGP), lithium ion conductive glass ceramics (LLOGS), or a combination thereof.

16. The core-shell structure as claimed in claim 1, wherein the core particle comprises:
a core; and
a solid-state electrolyte formed on a surface of the core.

17. An electrode, comprising the core-shell structure of claim 1.

18. The electrode as claimed in claim 17 disposed in a lithium ion battery as a cathode.

19. A metal-ion battery, comprising:
a cathode, an anode and a separator between the cathode and the anode,
wherein the cathode comprises the core-shell structure of claim 1.

20. An ion-conducting material, comprising:
a lithium-containing linear polymer represented by formula (1):

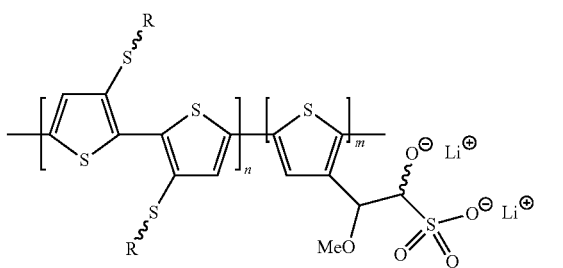

wherein R is independently selected from $C_6$-$C_{30}$ alkyl group; m is greater than 30 and no more than 100; n is greater than 30 and no more than 100; m and n are positive integers; and Me is a methyl group.

* * * * *